(12) United States Patent
Tanaka et al.

(10) Patent No.: US 7,492,707 B2
(45) Date of Patent: Feb. 17, 2009

(54) TRANSMITTING DEVICE FOR ASSIGNING DATA FOR RECEIVING DEVICE SELECTED FROM PLURALITY OF RECEIVING DEVICES TO SHARED CHANNEL

(75) Inventors: Atsuya Tanaka, Annaka (JP); Yoshiharu Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 11/151,486

(22) Filed: Jun. 13, 2005

(65) Prior Publication Data
US 2005/0227716 A1    Oct. 13, 2005

Related U.S. Application Data

(63) Continuation of application No. PCT/JP03/05331, filed on Apr. 25, 2003.

(51) Int. Cl.
*G01R 31/08* (2006.01)
*H04J 3/00* (2006.01)
(52) U.S. Cl. ..................... 370/225; 370/345
(58) Field of Classification Search ............. None
See application file for complete search history.

(56) References Cited

U.S. PATENT DOCUMENTS

| 2002/0105937 A1 | 8/2002 | Takeuchi et al. |
| 2003/0012220 A1 | 1/2003 | Kim et al. |
| 2003/0021245 A1 | 1/2003 | Haumonte et al. |
| 2003/0050084 A1* | 3/2003 | Damnjanovic et al. ...... 455/522 |
| 2003/0096635 A1 | 5/2003 | Uehara et al. |
| 2004/0142698 A1* | 7/2004 | Pietraski ................... 455/452.2 |

FOREIGN PATENT DOCUMENTS

EP    1 437 873    7/2004

(Continued)

OTHER PUBLICATIONS

Supplementary European Search Report dated Nov. 15, 2007, from the corresponding European Application.

(Continued)

*Primary Examiner*—Wing F Chan
*Assistant Examiner*—Eunsook Choi
(74) *Attorney, Agent, or Firm*—Katten Muchin Rosenman LLP

(57) ABSTRACT

A transmitting device for transmitting data by means of wireless signals to at least one of a plurality of receiving devices via a channel shared by the plurality of receiving devices is provided. The transmitting device receives reception quality data from each of the plurality of receiving devices; determines future predicted values relating to the reception quality of the respective receiving devices on the basis of the one or plurality of sets of past reception quality data; and selects receiving devices and assigns transmission data to be transmitted to the selected receiving devices to the channel on the basis of the future predicted values. The rate of generation of reception data errors on the side of the receiving devices and data re-transmission rate due to data errors can be reduced, and the throughput can be improved.

13 Claims, 13 Drawing Sheets

FOREIGN PATENT DOCUMENTS

| | | |
|---|---|---|
| JP | 2001-157258 | 6/2001 |
| JP | 2002-171287 | 6/2002 |
| JP | 2002-290327 | 10/2002 |
| WO | 98/35514 | 8/1998 |
| WO | 02/45362 | 6/2002 |
| WO | 02/089424 | 11/2002 |
| WO | 03/034677 | 4/2003 |

OTHER PUBLICATIONS

Rudolf Tanner, et al. "A Comparison of Fading Channel State Prediction Techniques" Wireless International Conference on Wireless Communication, Jul. 8, 2002, pp. 312-317.

International Search Report dated Aug. 5, 2003.

Yoshiaki Ofuji, et al. Comparisons of Packet Scheduling Methods Focusing on Throughput of Each User in High Speed Downlink Packet Access. Techincal Report of IEICE, Mar. 2002.

* cited by examiner

TRANSMITTING DEVICE FOR ASSIGNING DATA FOR RECEIVING DEVICE SELECTED FROM PLURALITY OF RECEIVING DEVICES TO SHARED CHANNEL

CROSS-REFERENCE TO RELATED APPLICATION

This application is a continuation of International Application PCT/JP2003/005331, filed on Apr. 25, 2003, pending at the time of filing of this continuation application, the contents of which are herein wholly incorporated by reference.

TECHNICAL FIELD

The present invention relates to a transmitting device for transmitting data by means of wireless signals to at least one of a plurality of receiving devices via a channel shared by said plurality of receiving devices, and more concretely relates to a transmitting device which selects a receiving device, assigns transmission data to be transmitted to said selected receiving device to a channel, and transmits this data to said selected receiving device, in order to improve the throughput. Furthermore, the present invention relates to a base station device using such a technique. Moreover, the present invention relates to an assignment method for assigning transmission data to be transmitted to a receiving device selected from a plurality of receiving devices to a wireless signal channel shared by said plurality of receiving devices, and more concretely relates to an assignment method that makes it possible to improve the throughput.

BACKGROUND ART

HSDPA (high speed data packet access) systems of high speed packet transfer systems have been investigated as transfer systems for down-link channels in third generation mobile communications systems using code division multiple access (CDMA) systems, especially W-CDMA (wideband CDMA) systems.

In such HSDPA systems, code division multiplexing and time division multiplexing are used in combination, and a plurality of time slots are provided for time division multiplexing in the respective down-link channels. Furthermore, data for a mobile station (user) is assigned to each time slot and transmitted.

In the case of such an HSDPA system, several schedulers have been proposed for determining which user's data is assigned to which time slot, i.e., for determining the transmission timing of the user data. For instance, the maximum CIR method, proportional fairness method (maximum fluctuation user selection method) and the like have been proposed (for example, see Patent Reference 1).

The maximum CIR method is a method in which the reception quality values of the respective mobile stations are compared, and data of the mobile station with the best reception quality is given priority in assignment to a time slot. The proportional fairness method is a method in which the data for which the ratio of the mean reception quality value for each mobile station (reception quality averaged over time at each mobile station) to the instantaneous reception quality shows a maximum value is given priority in assignment to a time slot. Thus, in both of these scheduling methods, the assignment of time slots is determined on the basis of reception quality, notification of which is received from the mobile stations.

However, in actual scheduling devices that perform scheduling, a processing delay is generated from the time that the reception quality is acquired from the mobile stations to the time that scheduling is performed and data is assigned to time slots and transmitted. Because of this processing delay, the conditions of the wireless transmission path vary by the time that data is transmitted from the base station to the mobile stations by means of time slots, so that there is a danger that a problem of a drop in throughput due to erroneous assignment of the data transfer rate will arise.

FIG. 14 shows the variation in the conditions of the transfer path according to this processing delay. The horizontal axis indicates time. The vertical axis indicates the information that is provided by the mobile station (mobile station information, reception quality), e.g., the signal-to-interference ratio (SIR) of the mobile station. The mobile station periodically transmits this mobile station information to the base station. The time instant t1 at the point P1 is the time instant at which the mobile station measures its own reception quality (this may be viewed as the time instant at which the wireless packet in the base station is assigned to a time slot). This value S1 is the value of the reception quality at the time instant t1. The time instant t2 at the point P2 is the time instant at which the wireless packed assigned to a time slot by the base station is transmitted to the mobile station; this value S2 is the reception quality at the time instant t2.

Thus, as a result of the time delay d (=t2−t1) between the points P1 and P2, the reception quality at the actual time of transmission of the packet differs from the reception quality at the time of wireless packet assignment. Even if a packet is transmitted to a mobile station selected on the basis of the value of the reception quality at the time instant t1, in cases where the reception quality has dropped at the time of transmission, it may become impossible for the mobile station to receive data, or large numbers of data errors may be generated, so that a large quantity of processing such as the re-sending of packets or the like is necessary. As a result, the throughput drops.

Furthermore, a conventional technique for the selection of the base station by the mobile station is a technique in which the mobile station schedules the measurement of the reception electric field intensity of the signals from a plurality of base stations, and efficiently selects the base station prior to updating (for example, see Patent Reference 1).

Furthermore, a technique relating to a base station device which monitors the transmitting power of a plurality of communications terminals, schedules a shared channel on the basis of the monitoring results, and performs the transmission of this shared channel according to this scheduling, is known as a conventional technique in which the base station device performs MSC selection and scheduling of a shared channel (DSCH) in which a single channel is used by a plurality of communications terminals (for example, see Patent Reference 2).

Non-Patent Reference 1
  Shingaku Giho RCS2001-291, pp. 51-58, March 2002 "Characteristic comparison of scheduling methods noting throughput of respective users in down-link high-speed packets".

Patent Reference 1
  Japanese Patent Application Laid-Open No. 2001-157258

Patent Reference 2
  Japanese Patent Application Laid-Open No. 2002-290327

DISCLOSURE OF THE INVENTION

It is an object of the present invention to provide a transmitting device, a base station device and a method for assigning data from a transmitting device to a receiving device which can improve throughput.

The transmitting device of the present invention is a transmitting device for transmitting data to at least one of a plurality of receiving devices by means of wireless signals via a channel shared by a plurality of receiving devices, this transmitting device comprising a receiving part which receives reception quality data for the respective receiving devices that is periodically transmitted from each of the abovementioned plurality of receiving devices, a storage part which stores one or a plurality of sets of past reception quality data for the abovementioned respective receiving devices, a prediction processing part which determines future predicted values relating to the reception quality of the respective receiving devices at the time of data transmission via the abovementioned channel on the basis of the one or plurality of sets of past reception quality data for the respective receiving devices stored in the abovementioned storage part and the current image quality data for the respective receiving devices received by the abovementioned receiving part, and an assignment processing part which selects receiving devices and assigns transmission data to be transmitted to the abovementioned selected receiving devices to said channel on the basis of the future predicted values for the respective receiving devices at the time of data transmission determined by the abovementioned prediction processing part.

The assignment method of the present invention is an assignment method for assigning transmission data to a receiving device selected from a plurality of receiving devices to a wireless signal channel shared by the abovementioned plurality of receiving devices, wherein reception quality data for the respective receiving devices which is periodically transmitted from each of the abovementioned plurality of receiving devices is received, future predicted values relating to the reception quality of the respective receiving devices at the time of data transmission via the abovementioned wireless signal channel are determined on the basis of one or a plurality of received sets of reception quality data for the respective receiving devices and the current reception quality data for the respective receiving devices, a receiving device is selected on the basis of the abovementioned determined future predicted values of the respective receiving devices at the time of data transmission, and transmission data for the abovementioned selected receiving device is assigned to the abovementioned wireless signal channel.

The base station device of the present invention is a base station device which transmits data by means of wireless signals to at least one of a plurality of mobile station devices via a channel shared by said plurality of mobile station devices, this base station device comprising a receiving part which receives reception quality data for the abovementioned respective mobile station devices on a periodic basis from each of the abovementioned plurality of mobile station devices, a storage part which stores one or a plurality of sets of past reception quality data for the abovementioned respective mobile station devices, a prediction processing part which determines future predicted values relating to the reception quality of the respective mobile station devices at the time of data transmission via the abovementioned channel on the basis of the one or plurality of sets of past reception quality data for the respective mobile station devices stored in the abovementioned storage part and the current image quality data for the respective mobile station devices received by the abovementioned receiving part, and an assignment processing part which selects mobile station devices and assigns transmission data to be transmitted to the abovementioned selected mobile station devices to said channel on the basis of the future predicted values for the respective mobile station devices at the time of data transmission determined by the abovementioned prediction processing part.

In the present invention, future predicted values relating to the respective receiving devices (respective mobile station devices) at the time of data transmission are determined, and receiving devices (mobile station devices) are selected on the basis of these predicted future values. Furthermore, the transmission data for the selected receiving devices (mobile station devices) is assigned to a channel. Specifically, in the assignment of data to this channel, the processing delay extending from the time at which the reception quality of the respective receiving devices (respective mobile station devices) is measured to the time of data transmission in the transmitting device is taken into account. Thus, since the receiving devices (mobile station devices) are selected on the basis of future predicted values relating to the reception quality at the time of data transmission, receiving devices (mobile station devices) that are in a favorable reception state can be accurately selected, so that the rate of generation of reception data errors on the side of the receiving devices (mobile station devices) and data re-transmission rate due to data errors can be reduced, and the throughput can be improved.

BEST MODE FOR CARRYING OUT THE INVENTION

Embodiments using the present invention in a mobile communications system will be described below.

Figure 1:
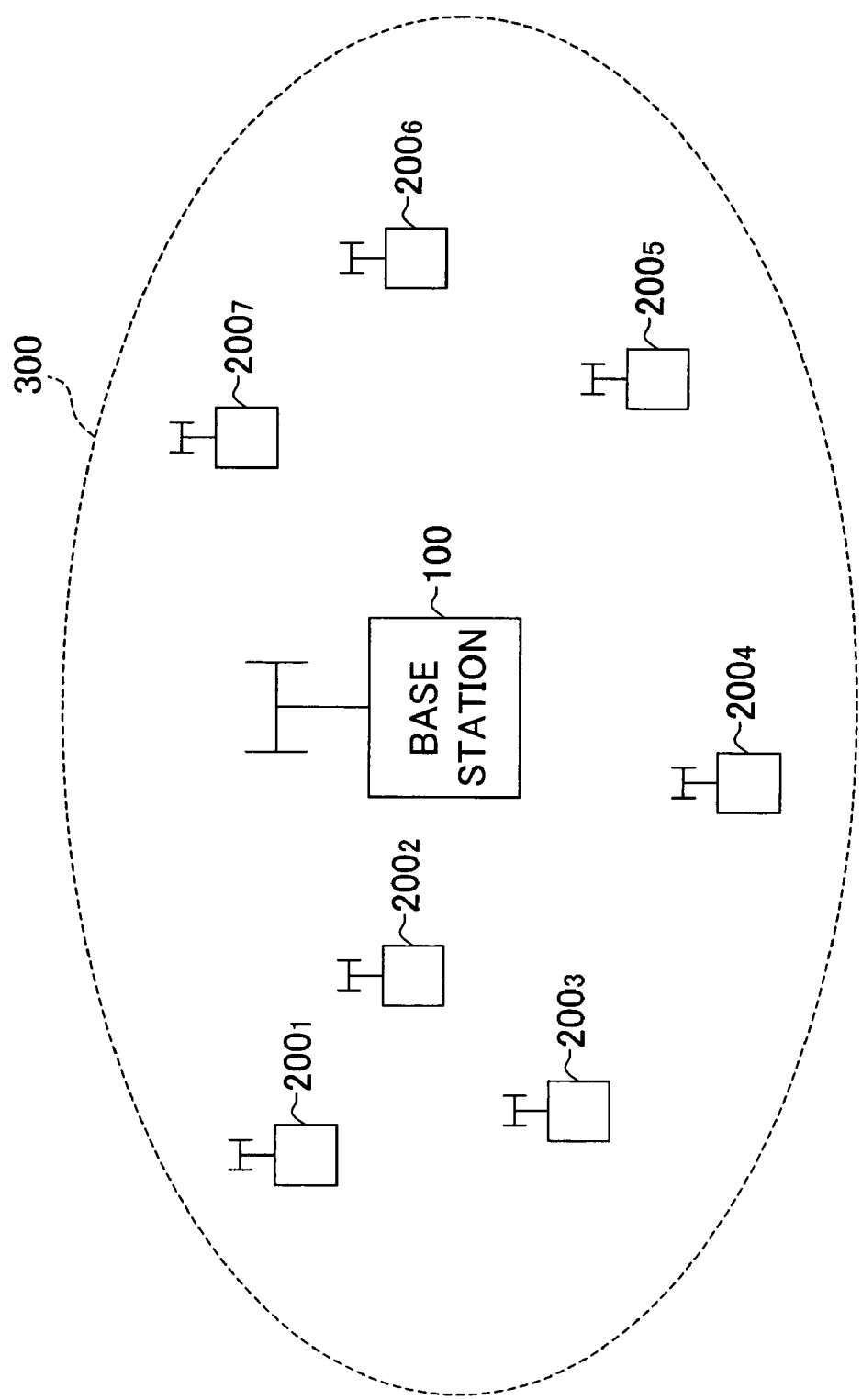
FIG. 1 is a block diagram showing the overall construction of a mobile communications system using the present invention.

FIG. 1 is a block diagram which shows the overall construction of a mobile communications system using the present invention. This mobile communications system has a base station 100 and a plurality (m (m is an integer of two or greater), in the example shown in FIG. 1, m=7) of mobile stations $200_1$ through $200_{m(7)}$, and utilizes a W-CDMA system as a communications system; furthermore, an HSDPA system is used for the down-link. Furthermore, the oval 300 indicated by a broken line in FIG. 1 indicates the range of the area (cell) of the base station 100.

Below, embodiments in which the present invention is applied to the base station 100 (among the constituent elements of this communications system) will be described. Accordingly, the present invention is used for the assignment of user data (wireless packets) to down-link time slots from the base station 100 to the mobile stations $200_1$ through $200_m$.

Embodiments of the transfer path assignment device that assigns wireless packets to time slots in the base station 100 will be described below.

First Embodiment

Figure 2:
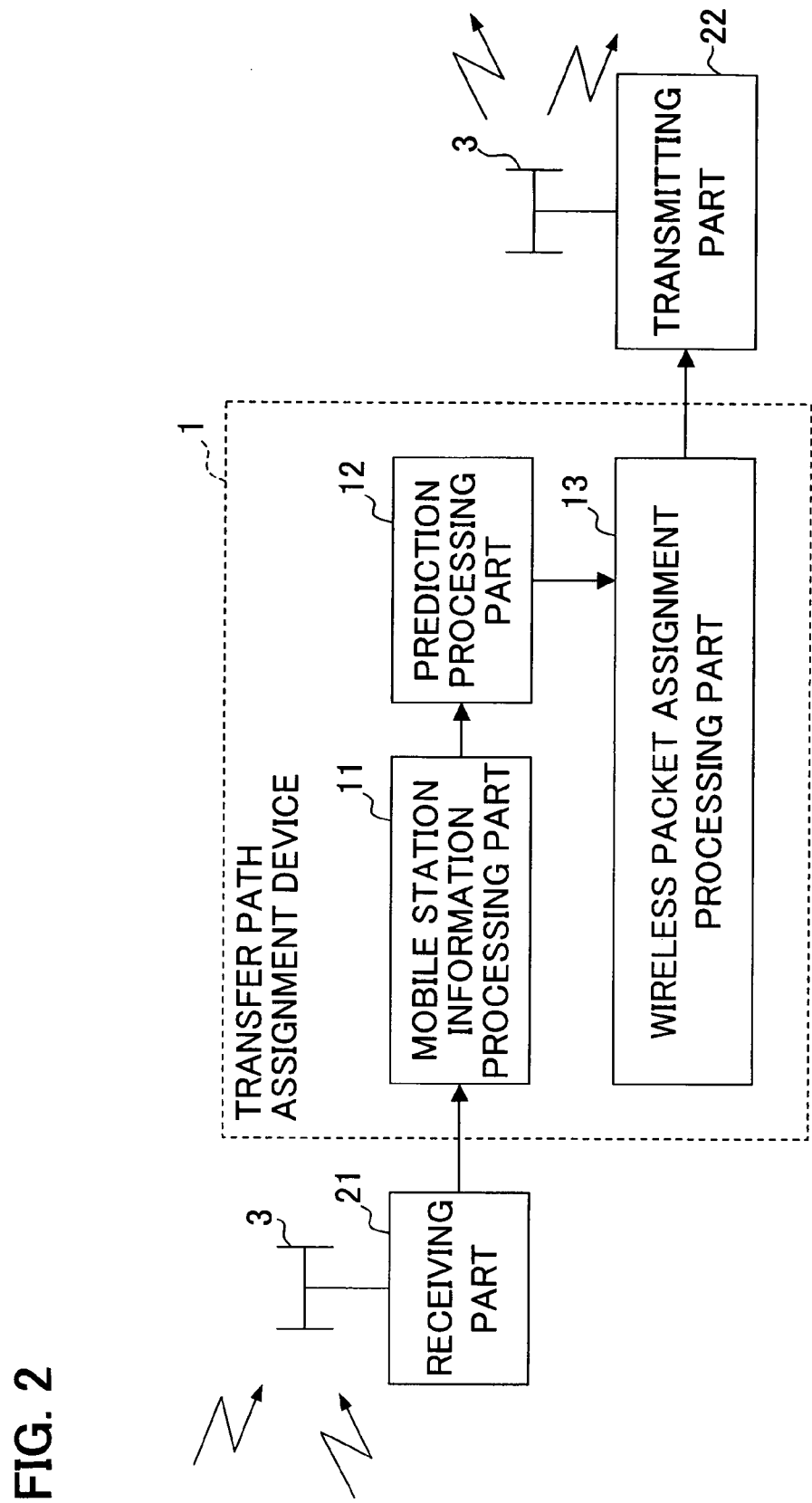
FIG. 2 is a block diagram showing the construction of the transfer path assignment device disposed in the base station according to a first embodiment of the present invention.

FIG. 2 is a block diagram which shows the construction of the transfer path assignment device 1 disposed in the base station 100 according to a first embodiment of the present invention. This transfer path assignment device 1 has a mobile station information processing part 11 that is connected to a receiving part 21, a prediction processing part 12, and a wireless packet assignment processing part 13 that is connected to a transmitting part 22.

The receiving part 21 performs the demodulation, reverse expansion, analog/digital conversion and the like of the wireless signals from the mobile stations $200_1$ through $200_n$ received by the antenna 3, and sends the received signals to the mobile station information processing part 11 as digital signals. The mobile station information processing part 11 extracts the mobile station information required for wireless packet assignment that is contained in the received signals sent from the receiving part 21, and sends this information to the prediction processing part 12.

For example, such mobile station information (MSC (modulation coding set) or CQI (channel quality indicator)) required for this wireless packet assignment may include the reception quality for the respective mobile stations (e.g., signal-to-interference ratio (SIR), information obtained by performing a mathematical operation (e.g., multiplication) on the reception quality with the movement speed of the mobile station or the like). Below, the mobile station information for the mobile station $200_i$ (i=1~m) will be expressed as $MCS_i$.

Furthermore, each mobile station $200_i$ periodically notifies the base station 100 of its own mobile station information $MCS_i$ via a specified channel (e.g., a DPCCH-HS (HS-DSCH associated up-link dedicated control channel). Moreover, the base station 100 (prediction processing part 12) can receive mobile station information $MCS_1$ through $MCS_m$ substantially simultaneously from all of the mobile stations $200_1$ through $200_m$ that are present in the area 300.

On the basis of the mobile station information $MCS_1$ through $MCS_m$ sent from the mobile station information processing part 11, the prediction processing part 12 determines the evaluation values $F_1(n)$ through $F_m(n)$ that are used to determine which user wireless packet is to be assigned to the nth time slot.

In the conventional maximum CIR method, the evaluation values $F_1(n)$ through $F_m(n)$ are determined by the following equation (1).

$$Fi(n)=MCSi(n) \qquad (1)$$

Here, as was described above, i is an index that is used to specify the mobile station, and 1 through m are integers. Furthermore, the symbol n in $MCS_i(n)$ indicates that this is mobile station information used in the assignment of the wireless packet to the nth time slot.

Specifically, in the conventional maximum CIR method, the currently received value of the mobile station information MCS is taken "as is" as the evaluation value. Furthermore, the wireless packet assignment processing part 13 compares the evaluation values of the respective mobile stations, and assigns the wireless packet of the mobile station that has the maximum evaluation value to the nth time slot. In this method, however, the wireless packets are assigned to time slots as described in the section titled "Background Art", and the state of communications between the mobile stations and the base station at the time of actual transmission is not taken into account; accordingly, the assignment of an optimal time slot cannot always be accomplished.

Accordingly, in the present embodiment, the processing delay (control delay) is taken into account, wireless packets are disposed in down-link time slots in the transmitting part 22, the evaluation values at the time that transmission is performed (hereafter referred to as the "time of transmission") are predicted, and the assignment to time slots is determined on the basis of these predicted evaluation values.

Specifically, the prediction processing part 12 determines the evaluation value $F_i(n)$ considering the delay time d by means of the following equation (2), where d is the delay time from the time at which $MCS_i(n)$ is determined in the mobile station $200_i$ (or the reception time of $MCS_i(n)$ in the receiving part 21, mobile station information processing part 11 or prediction processing part 12) (hereafter referred to as the "reception time") to the abovementioned transmission time. Furthermore, the delay time d may be determined beforehand by simulation, experimentation or the like.

$$Fi(n)=MCSi(n+d) \qquad (2)$$

Here, $MCSi(n+d)$ is the value (future predicted value) of the mobile station information at the time of transmission taking into account the delay time d, and can be expressed by the following equation (3).

$$MCSi(n+d)=FuncAi[MCSi(n), MCSi(n-\tau), d] \qquad (3)$$

Here, the mobile station information $MCS_i(n-\tau)$ is mobile station information in the $(n-\tau)$th time slot, i.e., mobile station information that is in the past by an amount equal to $\tau$ time slots from the nth time slot.

The function $FuncA_i$ is a function that depends on the fluctuation of the mobile station information and the mobile station movement speed; this is a function that predicts the value of the mobile station information following the delay time d on the basis of the current mobile station information $MCS_i(n)$ and past mobile station information $MCS_i(n-\tau)$.

For example, various types of functions such as first-order functions, second-order functions or the like can be used as the function $FuncA_i$; an appropriate function is selected in accordance with the treatment capacity of the base station 100, fluctuations in the mobile station information and the like. Furthermore, the selected function can be set in the prediction processing part 12 as a program or hardware circuit.

Figure 13:
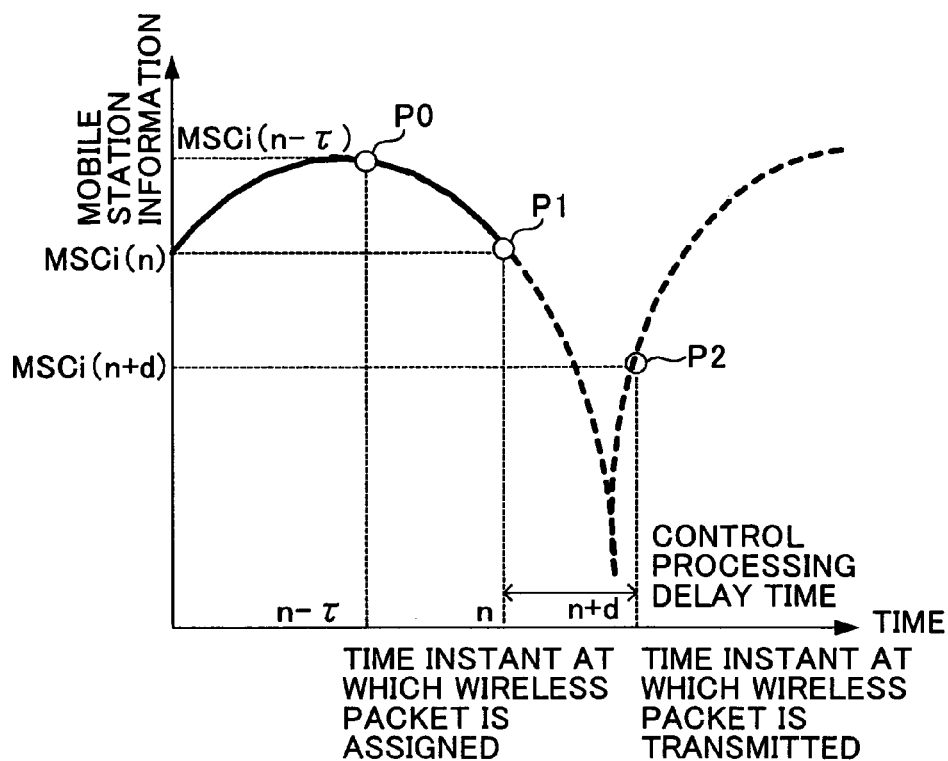
FIG. 13 is a graph showing the variation in the mobile station information.
Figure 14:
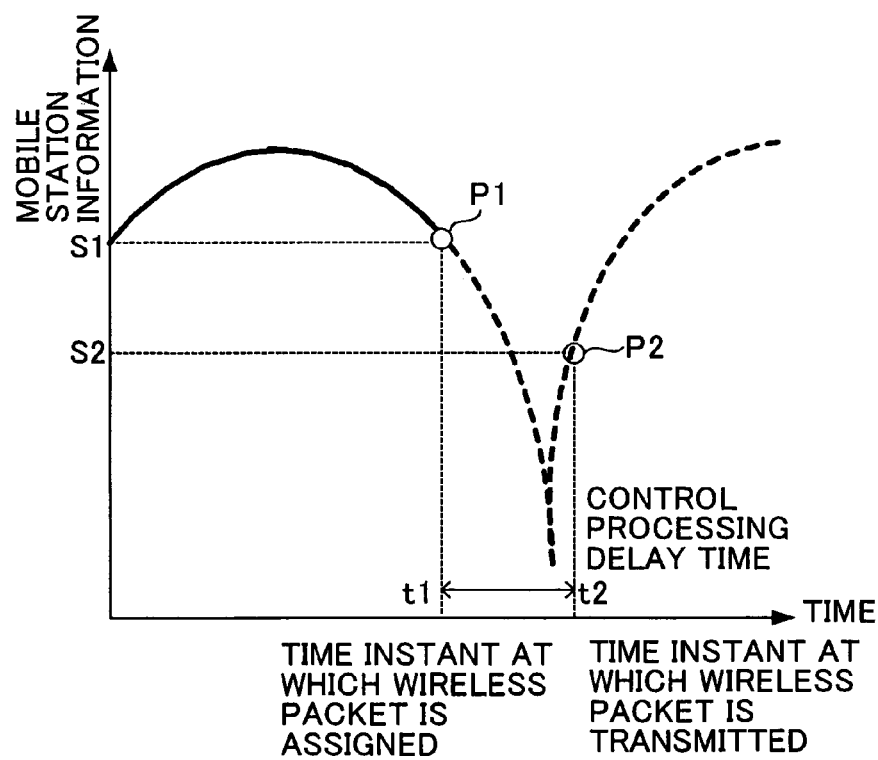
FIG. 14 is a graph showing the variation in the mobile station information.

For example, in a case where the function $FuncA_i$ is the first-order function $y=a \times x+b$, the slope a and segment b are determined by the coordinates [n, $MCS_i(n)$] of the point P1 of the mobile station information $MCS_i(n)$ and the coordinates [n−τ, $MCS_i(n-τ)$] of the point P0 of the mobile station information $MCS_i(n-τ)$, with reference to FIG. 13. Furthermore, the future predicted value $MCS_i(n+d)$ is determined by substituting the delay time n+d for the variable x of the function $FuncA_i=a \times x+b$ for which a and b have been determined.

Furthermore, the number (times) τ of the time slots can be set at a value that conforms to the movement speed of the respective mobile stations $200_i$, or can be set as a fixed number regardless of the movement speed of the mobile stations. In the former case, for example, τ can be set at a value that is approximately ¼ the phasing period determined by the movement speed. Furthermore, in the latter case, τ can be set at a value that is approximately ¼ the phasing period determined by the predetermined maximum movement speed. Moreover, in regard to the movement speed, each mobile station can determine its own movement speed, and can notify the base station 100 of this movement speed, or the base station 100 can determine the movement speeds of the respective mobile stations.

Thus, by taking the delay time d into account, it is possible to predict mobile station information at the time of transmission, i.e., at the point in time n+d of point P2 (that is, the future predicted value), as illustrated in the graph shown in FIG. 13.

The prediction processing part 12 determines the evaluation values (future predicted values) $F_1(n)$ through $F_m(n)$ of the mobile stations $200_i$ through $200_m$ on the basis of the abovementioned equations (2) and (3), and sends these evaluation values to the wireless packet assignment processing part 13.

The wireless packet assignment processing part 13 determines the mobile station wireless packet that is assigned to the nth time slot on the basis of the evaluation values $F_1(n)$ through $F_m(n)$ sent from the prediction processing part 12. For example, the existing maximum CIR method, proportional fairness method (maximum fluctuation user selection method) or the like can be used as wireless packet determination method.

For instance, in cases where the maximum CIR method is used, the maximum value (designated as the evaluation value $F_k(n)$) among the evaluation values (future predicted values) $F_1(n)$ through $F_m(n)$ is selected, and the wireless packet of the mobile station $200_k$ corresponding to the maximum evaluation value $F_k(n)$ is assigned to the time slot n.

Furthermore, in addition to assigning wireless packets to time slots, the wireless packet assignment processing part 13 determines the modulation system (QPSK, 16QAM or the like), expansion code number, transmission data amount and the like of the assigned wireless packets on the basis of the evaluatin value $F_k(n)$. Furthermore, the wireless packet assignment processing part 13 sends the (discriminator of) the selected mobile station $200_k$ (and if necessary, the packet number or discriminator of the selected wireless packet), along with the determined modulation system, expansion code number, transmission data amount and the like, to the transmitting part 22.

On the basis of the information sent from the wireless packet assignment processing part 13, the transmitting part 22 disposes wireless packets for the mobile station $200_k$ in the nth time slot, performs expansion, modulation and the like of the wireless packets, and transmits the wireless packets by means of wireless signals via the antenna 3.

Thus, in the present embodiment, the MSC at the time of transmission can be predicted on the basis of past MSC and current MSC; accordingly, the future predicted values (evaluation values) of mobile stations in which the reception quality improves increase as time passes. As a result, the probability of such mobile stations being selected by the wireless packet assignment processing part 13 increases. On the other hand, the future predicted values (evaluation values) of mobile stations in which the reception quality deteriorates decreases as time passes; as a result, the probability of such mobile stations being selected by the wireless packet assignment processing part 13 decreases. Accordingly, compared to conventional scheduling methods, the rate at which reception packets are discarded on the mobile station side, and the packet re-sending rate accompanying such discarding of reception packets, are reduced, so that the throughput can be increased.

Second Embodiment

Past mobile station information may also be taken as statistical values (e.g., average values) of past mobile station information in the first embodiment.

Figure 3:
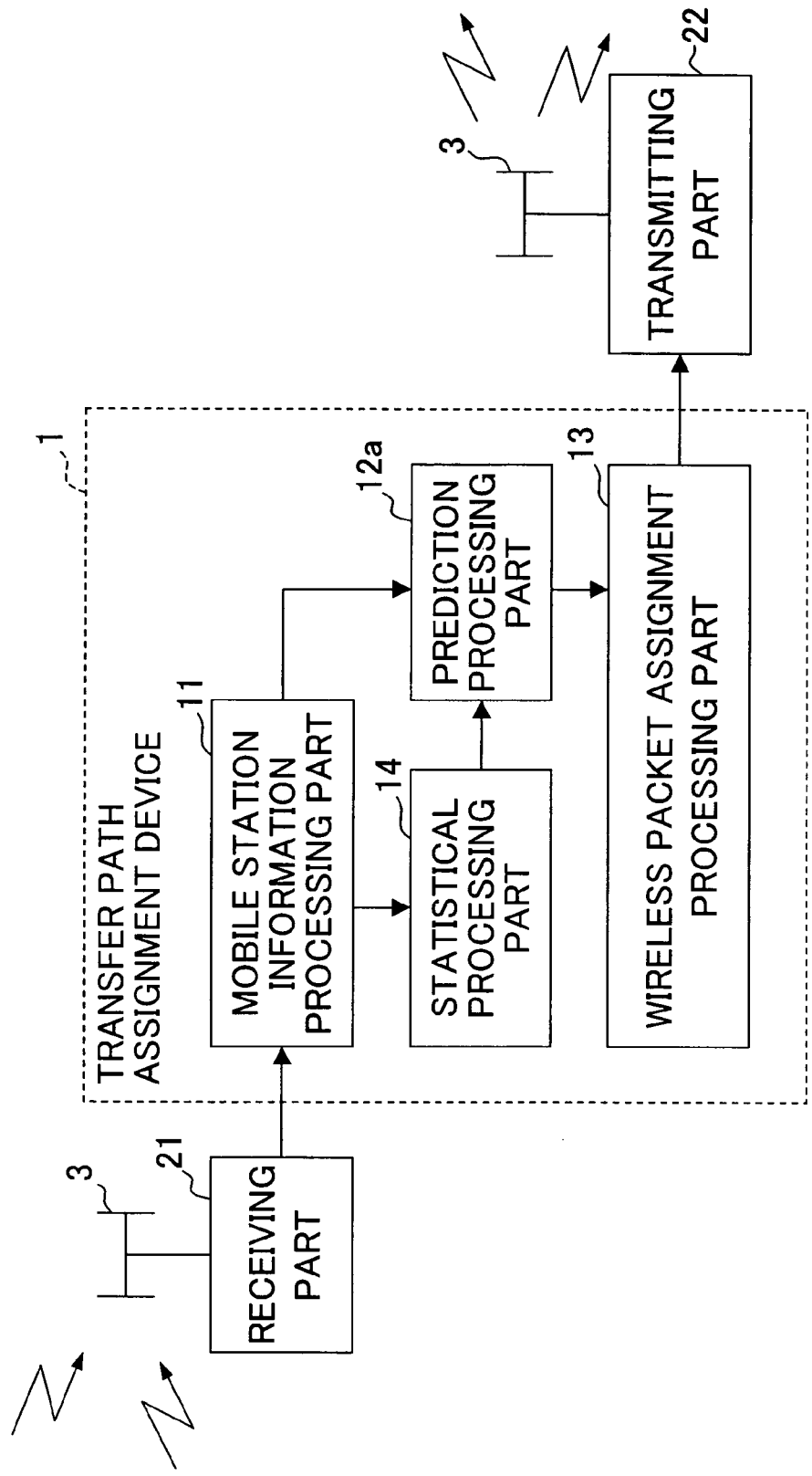
FIG. 3 is a block diagram showing the construction of the transfer path assignment device disposed in the base station according to a second embodiment of the present invention.

FIG. 3 is a block diagram showing the construction of the transfer path assignment device 1 installed in the base station 100 according to a second embodiment of the present invention. This transfer path assignment device 1 has a mobile station information processing part 11 connected to the receiving part 21, a prediction processing part 12a, a statistical processing part 14, and a wireless packet assignment processing part 13 connected to the transmitting part 22. Constituent elements which are the same as those in the first embodiment (mobile station information processing part 11, wireless packet assignment processing part 13, receiving part 21, transmitting part 22) are labeled with the same symbols, and a detailed description of such parts is omitted.

The mobile station information $MCS_i(n)$ that is gathered by the mobile station information processing part 11 is sent to the statistical processing part 14 and prediction processing part 12a.

The statistical processing part 14 holds past mobile station information for a specified period of time, subjects the mobile station information to statistical processing on the basis of the current mobile station information $MCS_i(n)$ sent from the mobile station information processing part 11 and the past mobile station information that is held, and sends the statistical processing results to the prediction processing part 12a.

For example, as statistical processing, the statistical processing part 14 determines the average value $aveMCS_i(n)$ obtained by averaging the current mobile station information $MCS_i(n)$ or one or a plurality of sets of past mobile station information as statistical processing results, and sends these results to the predication processing part 12a. More concretely, the average value $aveMCS_i(n)$ of five MCS values, i.e., the current mobile station information $MCS_i(n)$ and the four sets of mobile station information $MCS_i(n-1)$ through $MCS_i(n-4)$ corresponding to the past (n−1)st through (n−4)th time slots, is determined, and this value is sent to the prediction processing part 20a as the statistical processing results.

The prediction processing part 12a determines the evaluation values (future predicted values) $F_i(n)$ by means of the abovementioned equation (2) on the basis of the mobile station information $MCS_i(n)$ sent from the mobile station information processing part 11 and the statistical value, e.g., the average value $aveMCS_i(n)$ sent from the statistical processing part 14.

Here, $MCS_i(n+d)$ in the abovementioned equation (2) can be expressed by the following equation (4).

$$MCSi(n+d)=FuncBi[MCSi(n), aveMCSi(n), d] \quad (4)$$

The function $FuncB_i$ is a function that depends on the fluctuation of the mobile station information and the mobile station movement speed; this is a function that predicts the value of the mobile station information following the delay time d on the basis of the current mobile station information $MCS_i(n)$ and statistical result (average value) $aveMCS_i(n-\tau)$ For example, as in the case of the function $FuncA_i$ of the abovementioned first embodiment, various types of functions such as first-order functions, second-order functions or the like can be used as the function $FuncB_i$. For instance, in cases where the function $FuncB_i$ is the first-order function $y=a \times x+b$, the slope a and segment b are determined from the coordinates $[n, MCS_i(n)]$ (see FIG. 13) of the point P1 corresponding to the mobile station information $MCS_i(n)$ and the coordinates $[n-2, aveMCS_i(n)]$ corresponding to $aveMCS_i(n)$ (where x coordinate is center point of n−4 to n). Then, the future predicted value $MCS_i(n+d)$ is determined by substituting n+d for x of the function $FuncB_i$ for which a and b have been determined.

The prediction processing part 12a determines the evaluation values (future predicted values) $F_1(n)$ through $F_m(n)$ of the mobile stations $200_1$ through $200_m$ on the basis of the abovementioned equations (2) and (4), and sends these evaluation values to the wireless packet assignment processing part 13. As in the first embodiment, the wireless packet assignment processing part 13 selects a mobile station on the basis of the evaluation values $F_1(n)$ through $F_m(n)$, and assigns the wireless packet of the selected mobile station to the nth time slot. For example, the mobile station corresponding to the maximum evaluation value among the evaluation values $F_1(n)$ through $F_m(n)$ is selected. Then, in the transmitting part 22, the wireless packet is disposed in the assigned time slot, and is transmitted by means of a wireless signal.

In the present embodiment as well, the evaluation values of mobile stations in which the reception quality is improved increase as time passes; as a result, the selectivity for these mobile stations increases. On the other hand, the selectivity for mobile stations in which the reception quality deteriorates decreases. Accordingly, the throughput is improved compared to that obtained using a conventional scheduling method.

Third Embodiment

Figure 4:
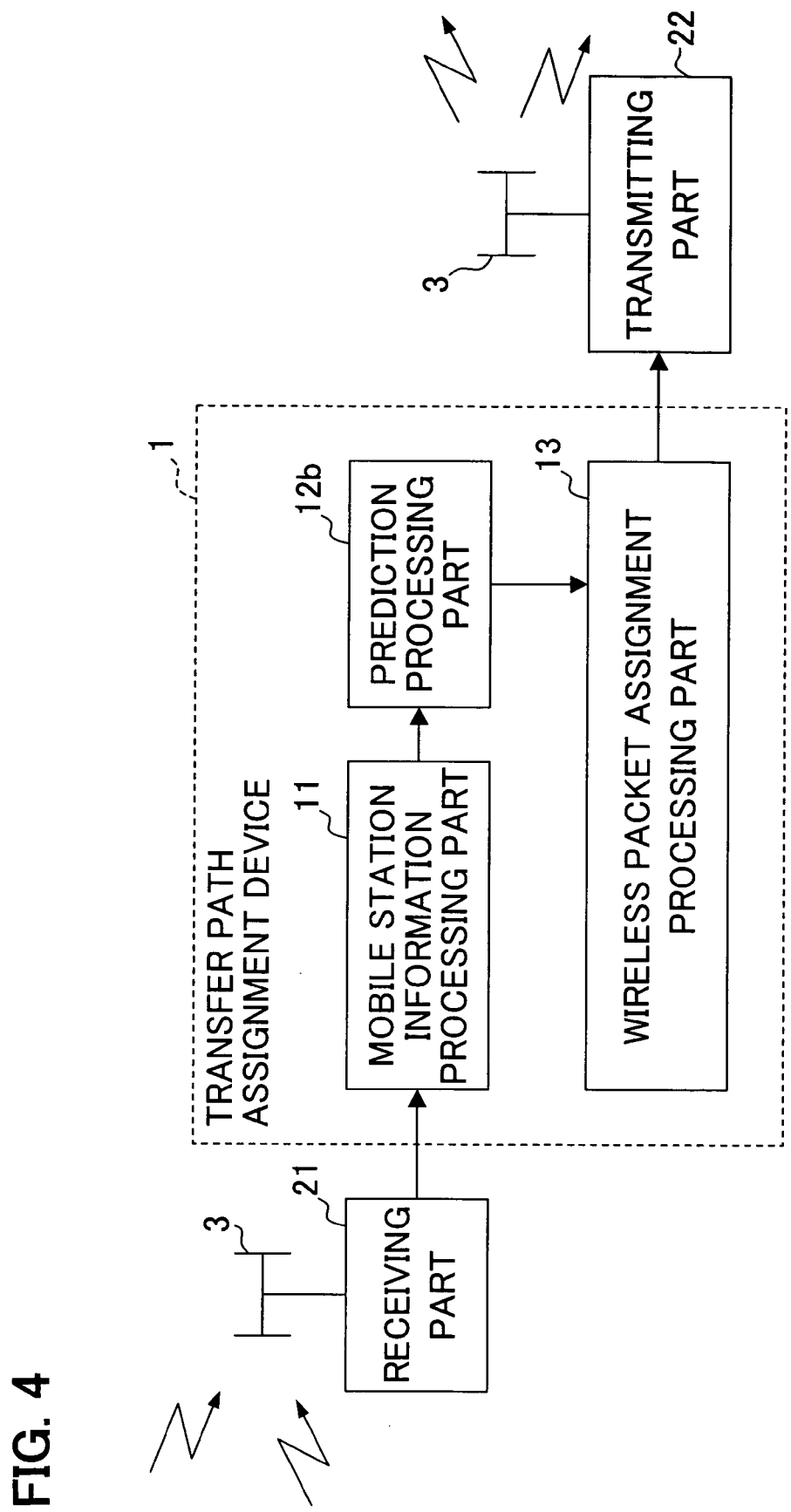
FIG. 4 is a block diagram showing the construction of the transfer path assignment device disposed in the base station according to a third embodiment of the present invention.

FIG. 4 is a block diagram which shows the construction of the transfer path assignment device 1 installed in the base station 100 according to a third embodiment of the present invention. This transfer path assignment device 1 has a mobile station information processing part 11 connected to the receiving part 21, a prediction processing part 12b, and a wireless packet assignment processing part 13 connected to the transmitting part 22. Constituent elements which are the same as those in the first embodiment (mobile station information processing part 11, wireless packet assignment processing part 13, receiving part 21, transmitting part 22) are labeled with the same symbols, and a detailed description of such parts is omitted.

The current mobile station information $MCS_i(n)$ is sent to the prediction processing part 12b from the mobile station information processing part 11. The prediction processing part 12b calculates the evaluation value $F_i(n)$ using the following equation (5).

$$Fi(n)=MCSi(n) \times A[MCSi(n+d)] \quad (5)$$

Here, the value determined by equation (3) in the abovementioned first embodiment may be used as $MCS_i(n+d)$, or the value determined by equation (4) in the second embodiment may be used as this value.

Furthermore, the function A is an increasing function in which the future predicted value $MCS_i(n+d)$ is a variable; for example, as in the case of the abovementioned FuncA and FuncB, various types of functions (increasing functions) such as first-order functions, second order functions or the like can be used as the abovementioned function A.

As a result, the evaluation value $F_i(n)$ is a value obtained by weighting the current mobile station information $MCS_i(n)$ by means of the function value A based on the future predicted value $MCS_i(n+d)$.

The wireless packet assignment processing part 13 selects the mobile station corresponding to the maximum evaluation value, and assigns the wireless packet of the selected mobile station to the nth time slot. The transmitting part 14 is the same as in the abovementioned first and second embodiments; accordingly, a detailed description of this part is omitted.

In the present embodiment, the evaluation values of mobile stations in which the reception quality is improved increase as time passes; as a result, the probability that such mobile stations will be selected is increased. On the other hand, the selection probability of mobile stations in which the reception quality deteriorates decreased; accordingly, the throughput can be improved compared to that in a conventional maximum CIR method.

Furthermore, the mobile station information processing part 11 may send the current mobile station information $MCS_i(n)$ to the wireless packet assignment processing part 13 in addition to the prediction processing part 12b, and the prediction processing part 12b may determine only the future predicted value $MCS_i(n+d)$ and send this value to the wireless packet assignment processing part 13; moreover, the wireless packet assignment processing part 13 may determine the evaluation value $F_i(n)$ by means of the abovementioned equation (5).

Fourth Embodiment

Figure 5:
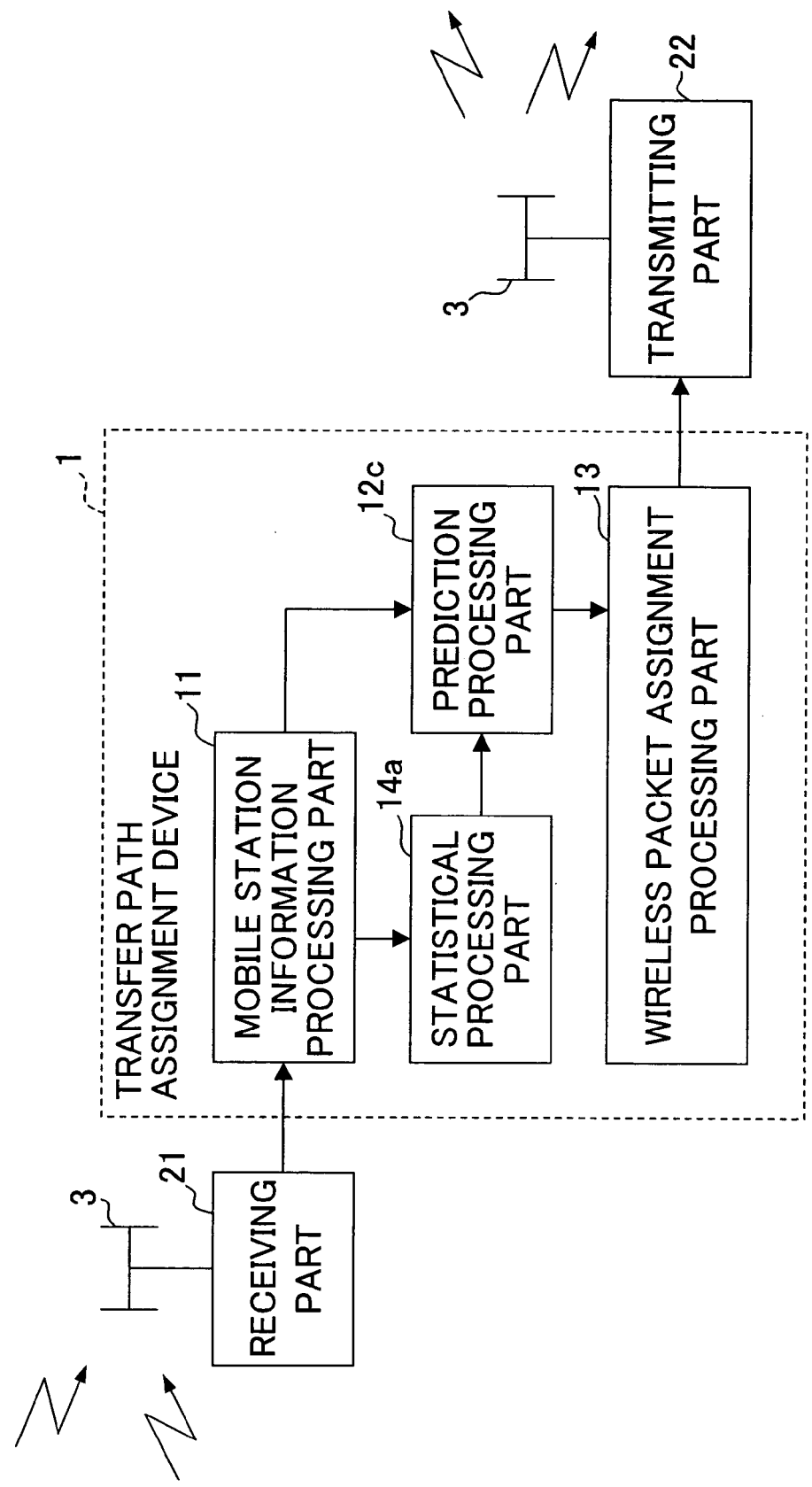
FIG. 5 is a block diagram showing the construction of the transfer path assignment device disposed in the base station according to a fourth embodiment of the present invention.

FIG. 5 is a block diagram which shows the construction of the transfer path assignment device 1 disposed in the base station 100 according to a fourth embodiment of the present invention. This transfer path assignment device 1 has a mobile station information processing part 11 connected to the receiving part 21, a prediction processing part 12c, a statistical processing part 14a, and a wireless packet assignment processing part 13 connected to the transmitting part 22. Constituent elements that are the same as in the first embodiment (mobile station information processing part 11, wireless packet assignment processing part 13, receiving part 21, transmitting part 22) are labeled with the same symbols, and a detailed description of such parts is omitted.

The mobile station information $MCS_i(n)$ collected by the mobile station information processing part 11 is sent to the statistical processing part 14a and prediction processing part 12c.

The statistical processing part 14a performs statistical processing on the basis of the mobile station information $MCS_i(n)$ sent from the mobile station information processing part 11, and sends the statistical processing results to the prediction processing part 12c. As an example of these statistical processing results, the same long-interval average aveMCS$_i$(n) as in the abovementioned second embodiment can be used.

The prediction processing part 12c determines the evaluation value F$_i$(n) on the basis of the mobile station information MCS$_i$(n) sent from the mobile station information processing part 11 and the statistical processing results (e.g., the long-interval average aveMCS$_i$(n)) sent from the statistical processing part 14a. The following equation (6) is the calculation formula for the evaluation value F$_i$(n) used in a case where the abovementioned long-interval average is used as the statistical processing results.

$$Fi(n) = \frac{MCSi(n)}{aveMCSi(n)} \times B[MCSi(n+d)] \quad (6)$$

Here, like the function A in the abovementioned third embodiment, the function B is an increasing function in which the future predicted value MCS$_i$(n+d) is a variable.

As a result, the evaluation value is a weighted value that depends on the future predicted value MCS$_i$(n+d).

The wireless packet assignment processing part 13 selects the mobile station corresponding to the maximum evaluation value, and assigns the wireless packet of the selected mobile station to the nth time slot. The transmitting part 22 is the same as that in the abovementioned first and second embodiments; accordingly, a detailed description of this part is omitted here.

In the present embodiment, the evaluation values of mobile stations in which the reception quality is improved increases as time passes (i.e., the selection probability becomes higher), while the selection probability of mobile stations in which the reception quality deteriorates decreases as time passes. Accordingly, the throughput is improved compared to that obtained in a conventional proportional fairness method.

Furthermore, the statistical processing part 14a may also send the statistical processing results and the current mobile station information to the wireless packet assignment processing part 13, the prediction processing part 12c may determine only the future predicted value MCS$_i$(n+d) and send this value to the wireless packet assignment processing part 13, and the wireless packet assignment processing part 13 may determine the evaluation value F$_i$(n) by means of the abovementioned equation (6).

Fifth Embodiment

Figure 6:
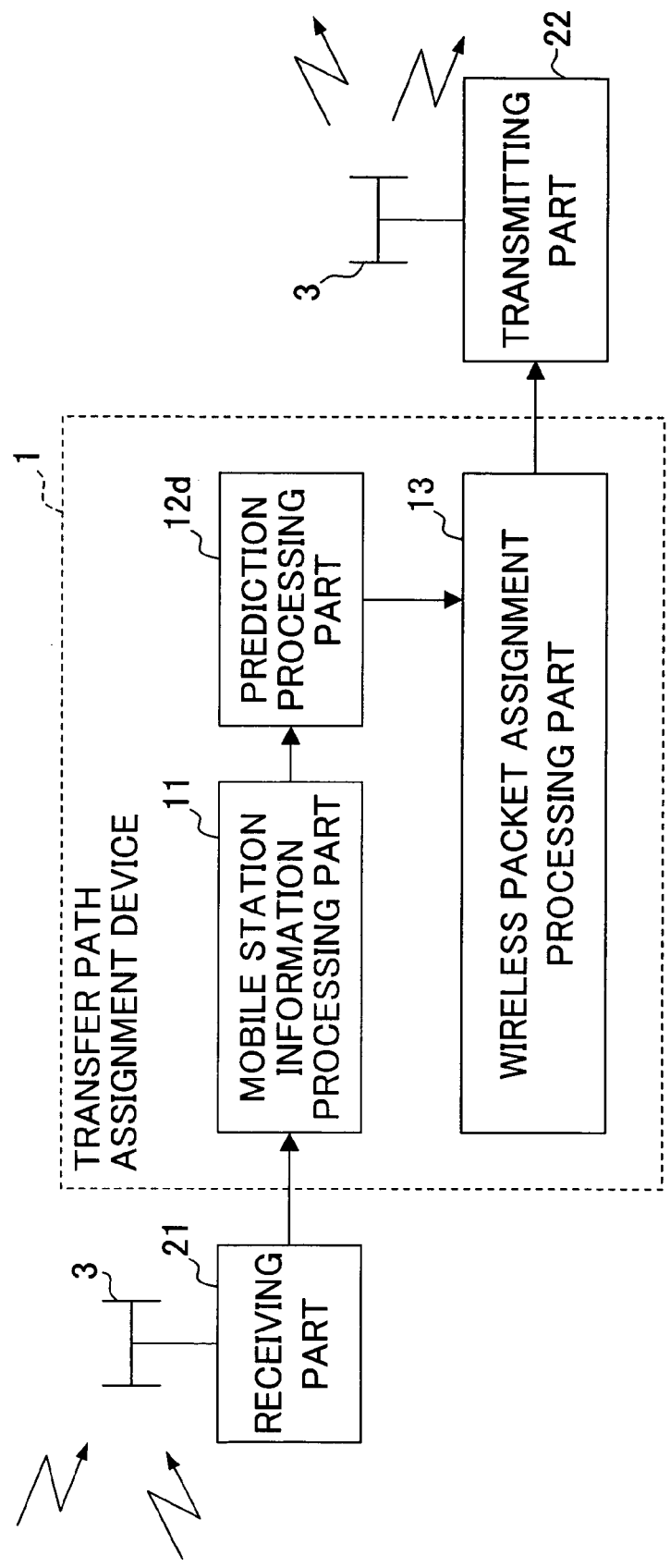
FIG. 6 is a block diagram showing the construction of the transfer path assignment device disposed in the base station according to a fifth embodiment of the present invention.

FIG. 6 is a block diagram which shows the construction of the transfer path assignment device 1 disposed in the base station 100 according to a fifth embodiment of the present invention. This transfer path assignment device 1 has a mobile station information processing part 11 connected to the receiving part 21, a prediction processing part 12d, and a wireless packet assignment processing part 13 connected to the transmitting part 22. Constituent elements that are the same as in the first embodiment (mobile station information processing part 11, wireless packet assignment processing part 13, receiving part 21, transmitting part 22) are labeled with the same symbols, and a detailed description of such parts is omitted.

The mobile station information MCS$_i$(n) that is collected by the mobile station information processing part 11 is sent to the prediction processing part 12d.

The prediction processing part 12d determines the evaluation value F$_i$(n) by means of the following equation (7) on the basis of the mobile station information MCS$_i$(n) sent from the mobile station information processing part 11.

$$Fi(n) = MCSi(n) \times C[MCSi(n+d), MCSi(n)] \quad (7)$$

Here, the value described in the abovementioned embodiments can be used as the future predicted value MCS$_i$(n+d). Furthermore, the function C is an increasing function that depends on the current mobile station information MCS$_i$(n) and future predicted value MCS$_i$(n+d).

For example, the current mobile station information MCS$_i$(n) and a specified threshold value are compared, and in cases where the mobile station information MCS$_i$(n) is equal to or greater than this specified threshold value (i.e., in cases where the reception quality is relatively good), the increasing function C can be set as C=a$_1$×MCS$_i$(n+d)+b, while in cases where the mobile station information MCS$_i$(n) is less than this specified threshold value, the increasing function C can be set as C=a$_2$×MCS$_i$(n+d)+b (here, 0<a$_1$<a$_2$). In cases where (for example) the 16QAM system is used as the modulation system when the reception quality is relatively good, and (for example) the QPSK system is used as the modulation system when the reception quality is relatively poor, the throughput can be further greatly improved by altering the increasing function C in accordance with the modulation system (and in accordance with the expansion code number and amount of transmitted data).

If this equation (7) is used, the weighting measure can be determined by the mobile station information MCS$_i$(n).

The processing performed by the wireless packet assignment processing part 13 and transmitting part 22 is the same as in the embodiments mentioned above; accordingly, a description of this processing is omitted.

In the present embodiment as well, the evaluation values of mobile stations in which the reception quality is improved increases as time passes (i.e., the selection probability becomes higher), while the selection probability of mobile stations in which the reception quality deteriorates decreases as time passes. Accordingly, the throughput can be improved compared to that obtained in a conventional maximum CIR method.

Furthermore, the mobile station information processing part 11 may send the current mobile station information MCS$_i$(n) to the wireless packet assignment processing part 13 in addition to the prediction processing part 12d, the prediction processing part 12d may determine only the future predicted value MCS$_i$(n+d) and send this value to the wireless packet assignment processing part 13, and the wireless packet assignment processing part 13 may determine the evaluation value F$_i$(n) by means of the abovementioned equation (7).

Sixth Embodiment

Figure 7:
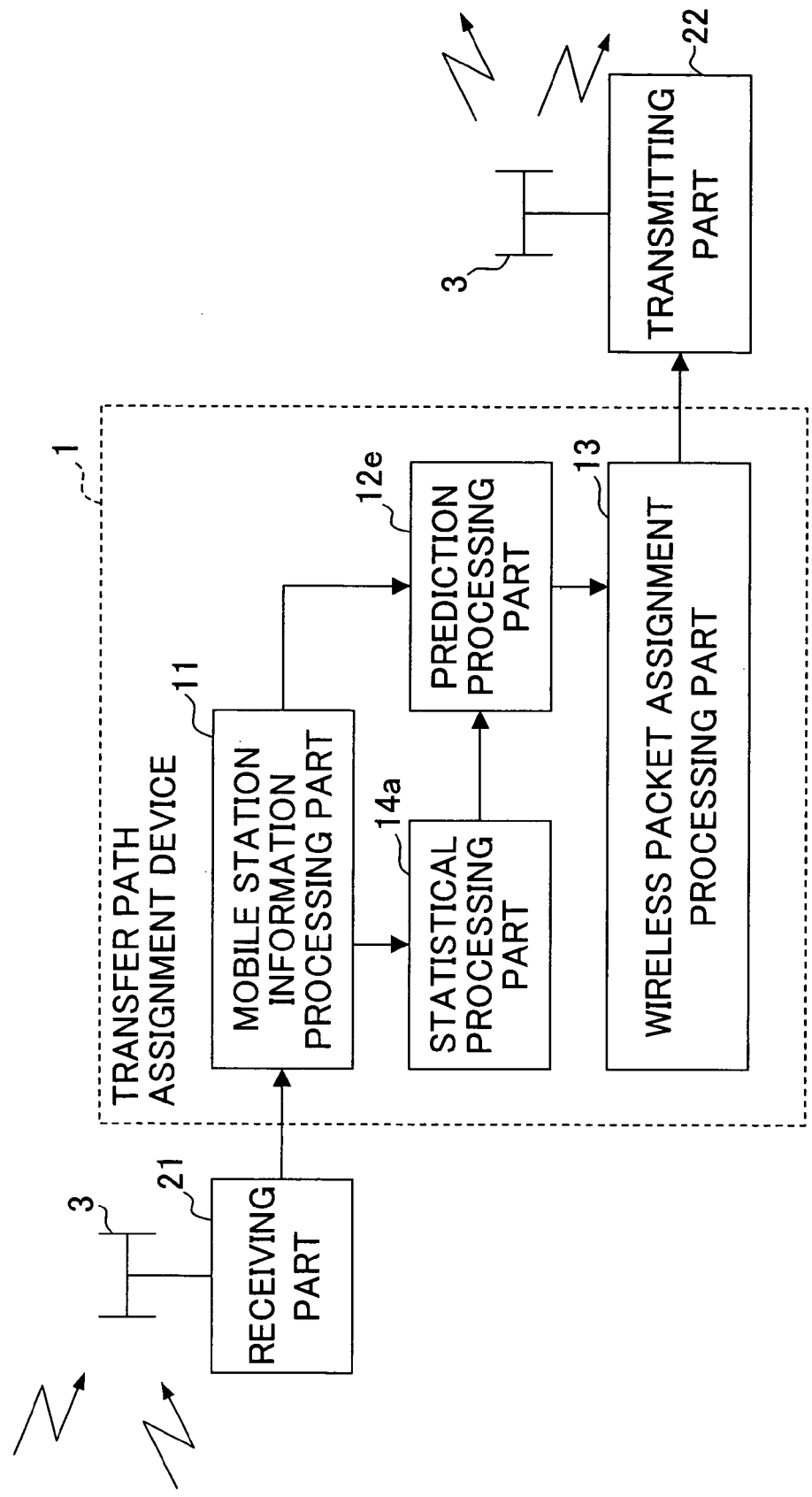
FIG. 7 is a block diagram showing the construction of the transfer path assignment device disposed in the base station according to a sixth embodiment of the present invention.

FIG. 7 is a block diagram which shows the construction of the transfer path assignment device 1 disposed in the base station 100 according to a sixth embodiment of the present invention. This transfer path assignment device 1 has a mobile station information processing part 11 connected to the receiving part 21, a prediction processing part 12e, a statistical processing part 14b, and a wireless packet assignment processing part 13 connected to the transmitting part 22. Constituent elements that are the same as in the first and fourth embodiments (mobile station information processing part 11, wireless packet assignment processing part 13, receiving part 21, transmitting part 22, statistical processing part 14a) are labeled with the same symbols, and a detailed description of such parts is omitted.

The mobile station information $MCS_i(n)$ that is collected by the mobile station information processing part 11 is sent to the statistical processing part 14a and prediction processing part 12e.

The statistical processing part 14a performs statistical processing on the basis of the mobile station information $MCS_i(n)$ as described in the fourth embodiment, and sends the statistical processing results (e.g., long-interval average $aveMCS_i(n)$) to the prediction processing part 12e.

The prediction processing part 12e determines the evaluation value $F_i(n)$ on the basis of the mobile station information $MCS_i(n)$ and the statistical processing results. The following equation (8) is the calculation formula for the evaluation value $F_i(n)$ in a case where the long-interval average is used as the statistical processing results.

$$Fi(n) = \frac{MCSi(n)}{aveMCSi(n)} \times D[MCSi(n+d), MCSi(n)] \qquad (8)$$

Here, the value described in the abovementioned embodiments can be used as the future predicted value $MCS_i(n+d)$. Furthermore, the function D is an increasing function which depends on the current mobile station information $MCS_i(n)$ and the future predicted value $MCS_i(n+d)$; for example, a function that is the same as function C described in the abovementioned fifth embodiment can be used. According to this equation (8), the weighting measure can be set by means of the mobile station information $MCS_i(n)$.

The processing performed by the wireless packet assignment processing part 13 and transmitting part 22 is the same as that performed in the embodiments described above; accordingly, a description of this processing is omitted.

In the present embodiment, the evaluation values of mobile stations in which the reception quality is improved increase as time passes (i.e., the selection probability becomes higher), while the selection probability of mobile stations in which the reception quality deteriorates decreases as time passes. Accordingly, the throughput is improved compared to that obtained in a conventional proportional fairness method.

Furthermore, the statistical processing part 14a may also send the statistical processing results and the current mobile station information to the wireless packet assignment processing part 13, the prediction processing part 12e may determine only the future predicted value $MCS_i(n+d)$ and send this value to the wireless packet assignment processing part 13, and the wireless packet assignment processing part 13 may determine the evaluation value $F_i(n)$ by means of the abovementioned equation (8).

Seventh Embodiment

Figure 8:
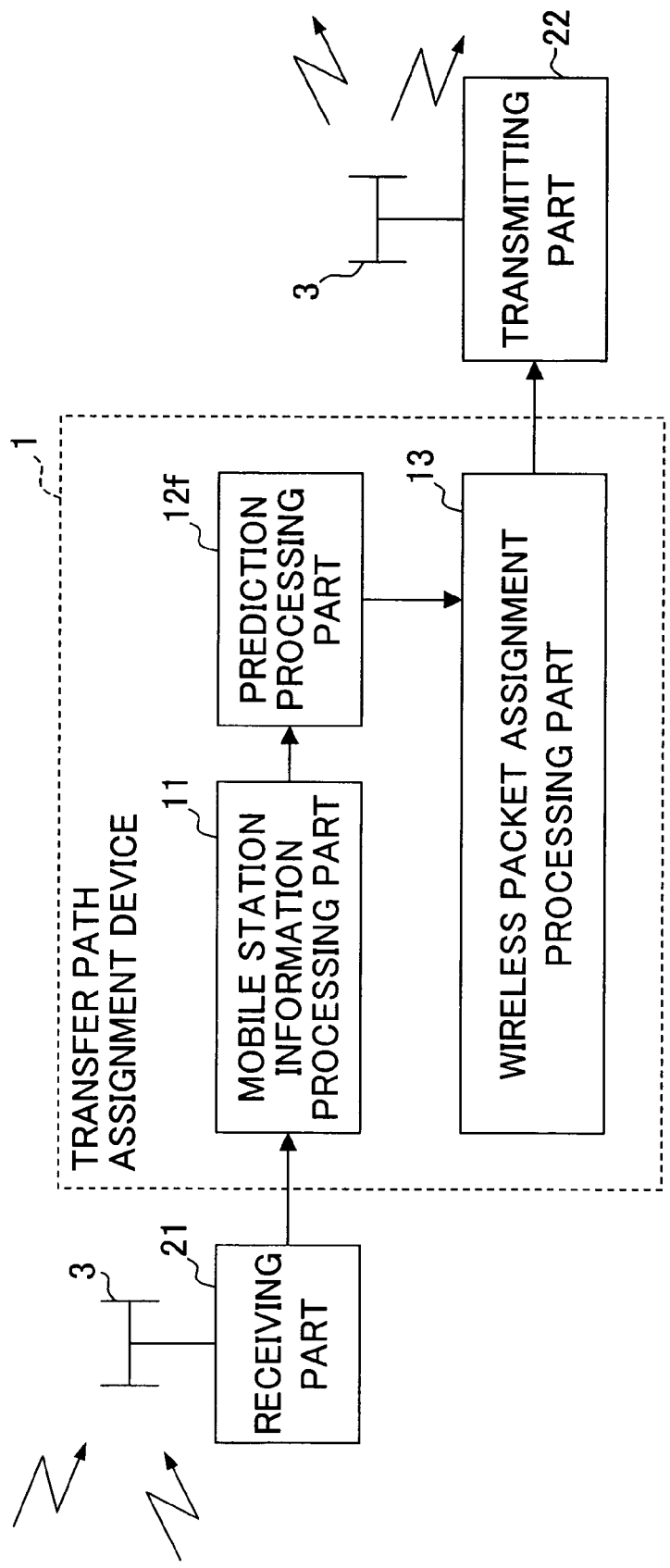
FIG. 8 is a block diagram showing the construction of the transfer path assignment device disposed in the base station according to a seventh embodiment of the present invention.

FIG. 8 is a block diagram which shows the construction of the transfer path assignment device 1 disposed in the base station 100 according to a seventh embodiment of the present invention. This transfer path assignment device 1 has a mobile station information processing part 11 connected to the receiving part 21, a prediction processing part 12f, and a wireless packet assignment processing part 13 connected to the transmitting part 22. Constituent elements that are the same as in the first embodiment (mobile station information processing part 11, wireless packet assignment processing part 13, receiving part 21, transmitting part 22) are labeled with the same symbols, and a detailed description of such parts is omitted.

The mobile station information $MCS_i(n)$ that is collected by the mobile station information processing part 11 is sent to the prediction processing part 12f.

On the basis of the mobile station information $MCS_i(n)$, the prediction processing part 12f determines the evaluation value $F_i(n)$ using the following equation (9).

$$Fi(n) = MCSi(n) \times E[MCSi(n+d), fi(n)] \qquad (9)$$

Here, a function obtained by dividing the current mobile station information $MCS_i(n)$ by the long-interval average $aveMCS_i(n)$ can be used as the function $f_i(n)$ as shown in the following equation (10).

$$fi(n) = \frac{MCSi(n)}{aveMCSi(n)} \qquad (10)$$

Furthermore, the function E is an increasing function that depends on the future predicted value $MCS_i(n+d)$ and the value of the function $f_i(n)$. For example, the function $f_i(n)$ and a specified threshold value are compared, an in cases where the value of $f_i(n)$ is equal to or greater than the specified threshold value (i.e., in cases where the reception quality is relatively good), the increasing function E can be set so that $E=a_3 \times MCS_i(n+d)+c$, while in cases where the value of $f_i(n)$ is less than the specified threshold value, the increasing function E can be set so that $E=a_4 \times MCS_i(n+d)+c$ (here $0<a_3<a_4$). In cases where (for example) the 16QAM system is used as the modulation system when the reception quality is relatively good, and (for example) the QPSK system is used as the modulation system when the reception quality is relatively poor, the throughput can be further greatly improved by altering the increasing function E in accordance with the modulation system.

According to this equation (9), the weighting measure can be set by means of $f_i(n)$.

The processing performed by the wireless packet assignment processing part 13 and transmitting part 22 is the same as that performed in the embodiments described above; accordingly, a description of this processing is omitted.

In the present embodiment as well, the evaluation values of mobile stations in which the reception quality is improved increase as time passes (i.e., the selection probability becomes higher), while the selection probability of mobile stations in which the reception quality deteriorates decreases as time passes. Accordingly, the throughput is improved compared to that obtained in a conventional maximum CIR method.

Furthermore, the mobile station information processing part 11 may send the current mobile station information $MCS_i(n)$ to the wireless packet assignment processing part 13 in addition to the prediction processing part 12f; the prediction processing part 12f may determine the future predicted value $MCS_i(n+d)$ and $f_i(n)$ and send this value to the wireless packet assignment processing part 13, and the wireless packet assignment processing part 13 may determine the evaluation value $F_i(n)$ by means of the abovementioned equation (7).

Eighth Embodiment

Figure 9:
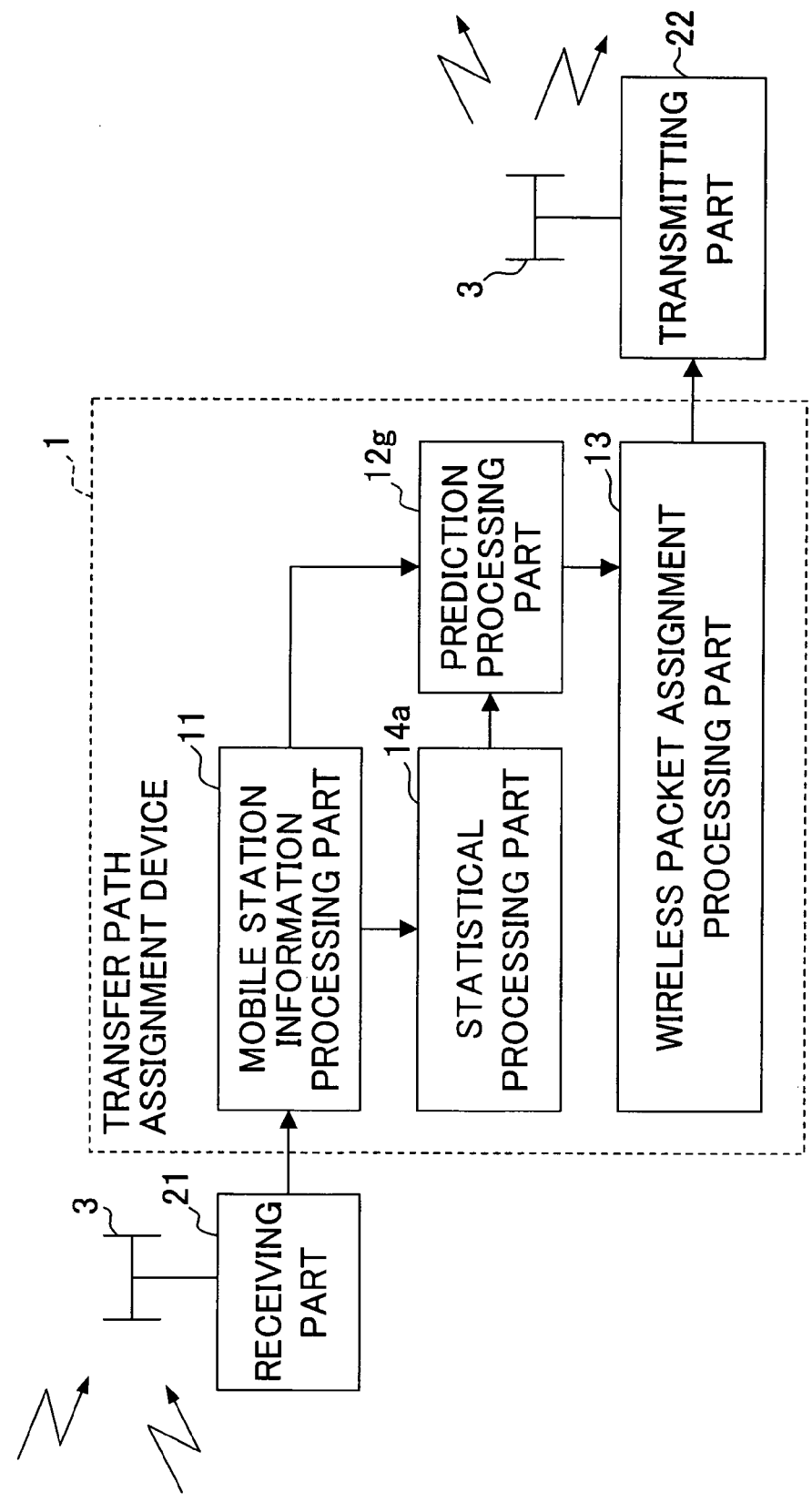
FIG. 9 is a block diagram showing the construction of the transfer path assignment device disposed in the base station according to an eighth embodiment of the present invention.

FIG. 9 is a block diagram which shows the construction of the transfer path assignment device 1 disposed in the base station 100 according to an eighth embodiment of the present invention. This transfer path assignment device 1 has a mobile station information processing part 11 connected to the receiving part 21, a prediction processing part 12g, a statistical processing part 14b, and a wireless packet assignment processing part 13 connected to the transmitting part 22. Constituent elements that are the same as in the first and fourth embodiments (mobile station information processing part 11, wireless packet assignment processing part 13, receiving part 21, transmitting part 22, statistical processing part 14a) are labeled with the same symbols, and a detailed description of such parts is omitted.

The mobile station information $MCS_i(n)$ that is collected by the mobile station information processing part 11 is sent to the statistical processing part 14a and prediction processing part 12g.

The statistical processing part 14a performs statistical processing on the basis of the mobile station information $MCS_i(n)$ as described in the fourth embodiment, and sends the statistical processing results (e.g., the long-interval average $aveMCS_i(n)$) to the prediction processing part 12g.

The prediction processing part 12g determines the evaluation value $F_i(n)$ on the basis of the mobile station information $MCS_i(n)$ and the statistical processing results. The following equation (11) is the calculation formula for the evaluation value $F_i(n)$ in a case where the long-interval average is used as the statistical processing results.

$$Fi(n) = \frac{MCSi(n)}{aveMCSi(n)} \times F[MCSi(n+d), fi(n)] \qquad (11)$$

Here, $f_i(n)$ is the function indicated in equation (10) of the abovementioned seventh embodiment, and the same function as the function E used in the abovementioned seventh embodiment can be used as the function F.

The processing of the wireless packet assignment processing part 13 and transmitting part 22 is the same as that described in the abovementioned embodiments; accordingly, a description is omitted here.

In the present embodiment, as in the embodiments described above, the throughput can be improved compared to that obtained in a conventional proportional fairness method.

Furthermore, the statistical processing part 14a may send the statistical processing results and the current mobile station information to the wireless packet assignment processing part 13, the prediction processing part 12g may determine the future predicted value $MCS_i(n+d)$ and send this value to the wireless packet assignment processing part 13, and the wireless packet assignment processing part 13 may determine the evaluation value $F_i(n)$ by means of the abovementioned equation (11).

Ninth Embodiment

The transfer rate (amount of transmitted data) to the mobile stations $200_i$ can also be corrected on the basis of the future predicted value $MCS_i(n+d)$.

Figure 10:
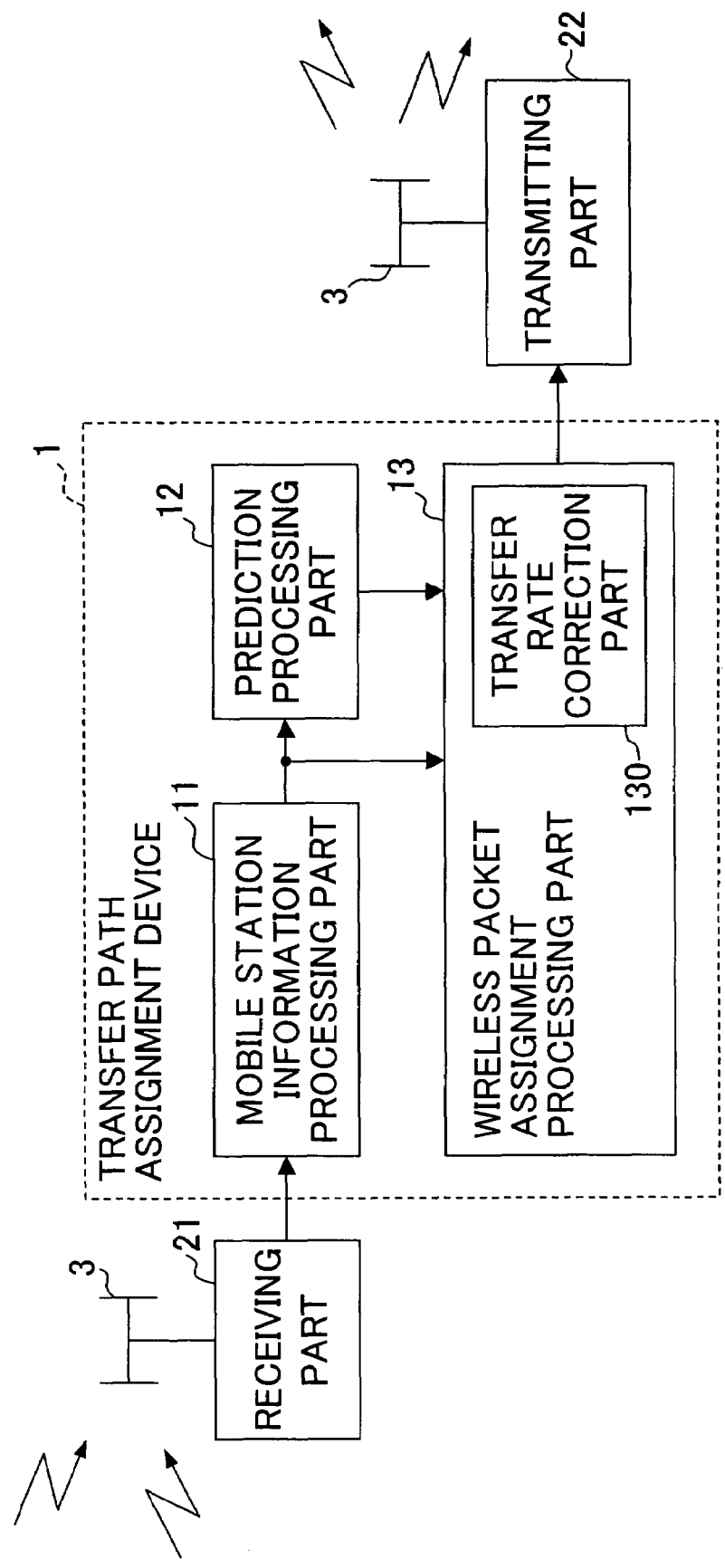
FIG. 10 is a block diagram showing the construction of the transfer path assignment device disposed in the base station according to a ninth embodiment of the present invention.

FIG. 10 is a block diagram which shows the construction of the transfer path assignment device 1 disposed in the base station 100 according to a ninth embodiment of the present invention. This transfer path assignment device 1 has a mobile station information processing part 11 connected to the receiving device 21, a prediction processing part 12, and a wireless packet assignment processing part 13 connected to the transmitting part 22. Furthermore, the wireless packet assignment processing part 13 has a transfer rate correction part 130. Constituent elements that are the same as in the first embodiment (mobile station information processing part 11, prediction processing part 12, wireless packet assignment processing part 13, receiving part 21, transmitting part 22) are labeled with the same symbols, and a detailed description of such parts is omitted.

In the wireless packet assignment processing part 13, as was described in the abovementioned embodiments, m evaluation values $F_1(n)$ through $F_m(n)$ sent from the prediction processing part 12 are compared, and the mobile station (mobile station $200_k$) corresponding to the maximum evaluation value is selected. Then, the wireless packet of the mobile station $200_k$ is assigned to the nth time slot.

In this assignment, the transfer rate correction part 130 corrects the transfer rate of the wireless packet assigned to the nth time slot. Specifically, the transfer rate correction part 130 acquires the mobile station information $MCS_i(n)$ from the mobile station information processing part 11, acquires the future predicted value $MCS_i(n+d)$ from the prediction processing part 12, and acquires information relating to the selected mobile station (discriminator of the mobile station or the like) from the wireless packet assignment processing part 13. Then, the transfer correction part 130 determines the corrected transfer rate R(n) by means of the following equation (12) on the basis of mobile station information (designated as $MCS_{sel}(n)$) and the future predicted value (designated as $MCS_{sel}(n+d)$) for the selected mobile station, $$R(n)=PRC[MCSsel(n)] \times G[MCSsel(n+d)] \qquad (12)$$

Figure 11:
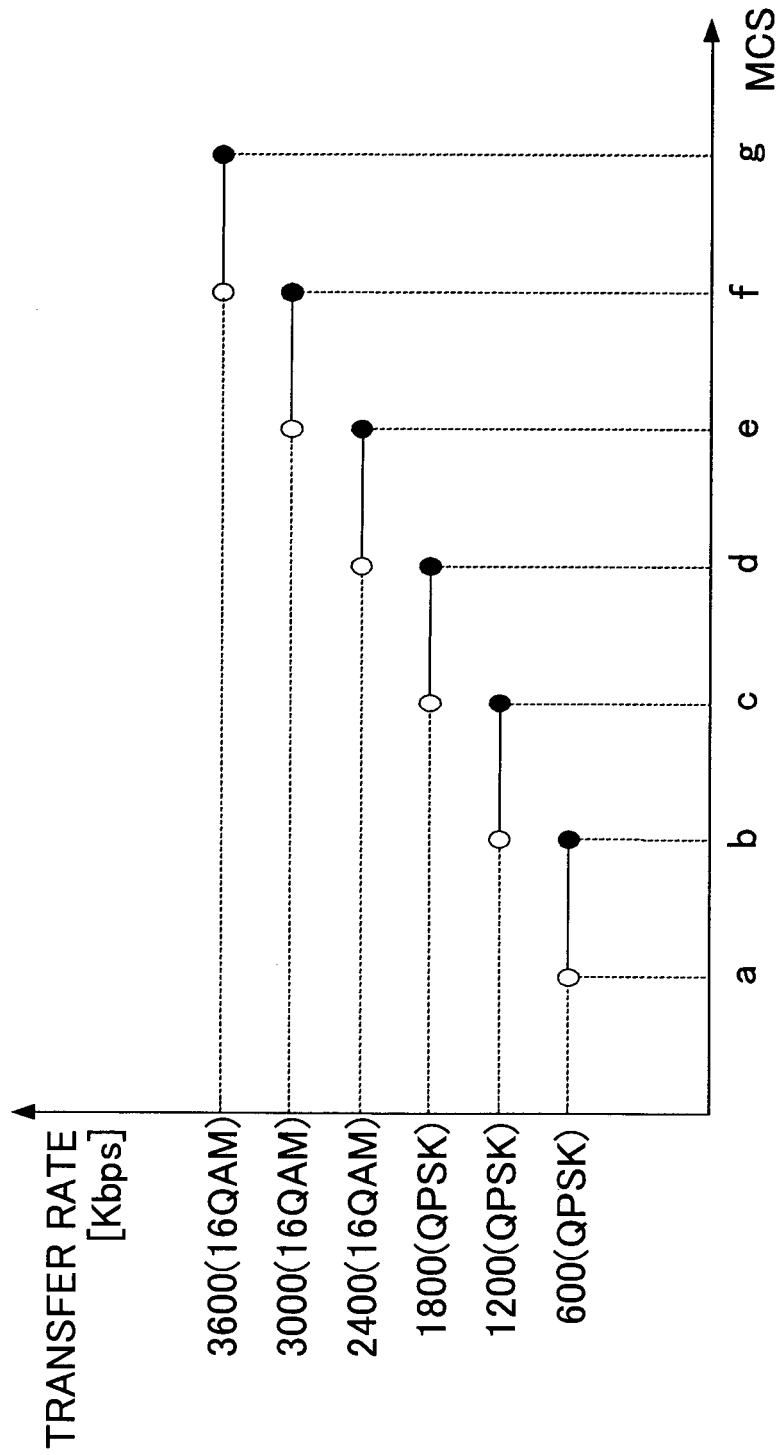
FIG. 11 shows one example of the function PRC.

Here, the function PRC is a function that converts the current mobile station information $MCS_{sel}(n)$ into a transfer rate. FIG. 11 shows one example of the function PRC. The horizontal axis is $MCS_{sel}(n)$, and the vertical axis is the transfer rate (Kbps). For example, in a case where $a<MCS_{sel}(n) \leq b$, the transfer rate is 600 Kbps, and in a case where $b<MCS_{sel}(n) \leq c$, the transfer rate is 1200 Kbps. The respective concrete values of a through g are set at appropriate values by experiment, simulation or in accordance with the operating conditions or the like. Furthermore, the notations in parentheses following the numerical values of the transfer rate indicate whether the modulation system is QPSK or 16QAM.

$G[MCS_{sel}(n+d)]$ in equation (12) is a correction term which corrects the transfer rate determined by the function PRC on the basis of the future predicted value $MCS_{sel}(n+d)$. The function G is an increasing function; a function that is the same as the function A or the like in the embodiments described above can be used as this function.

The wireless packet assignment processing part 13 determines the data amount by multiplying the corrected transfer rate R(n) determined by the transfer rate correction part 13 by the time of the nth time slot. Then, the wireless packet assignment processing part 13 sends this data amount to the transmitting part 22.

In the present embodiment, the transfer rates of the wireless packets of mobile stations in which the reception quality is improved are corrected toward the high side as time passes, while the transfer rates of the wireless packets of mobile stations in which the reception quality deteriorates are corrected toward the low side as time passes; accordingly, error in the transfer rate due to processing delay is suppressed, so that the throughput can be improved.

Tenth Embodiment

The transfer rate correction part 130 shown in FIG. 10 can also correct the transfer rate using the following equation (13).

$$R(n)=PRC[MCSsel(n) \times G[MCSsel(n+d)]] \quad (13)$$

Specifically, in equation (12) of the abovementioned ninth embodiment, the value of the function PRC is multiplied by the value of the function G; however, in equation (13) of the present embodiment, the value of the variable of the function PRC is multiplied by the value of the function G, and the value following this multiplication is converted into a transfer rate.

In the present embodiment as well, the transfer rates of the wireless packets of mobile stations in which the reception quality is improved are corrected toward the high side as time passes, while the transfer rates of the wireless packets of mobile stations in which the reception quality deteriorates are corrected toward the low side as time passes; accordingly, error in the transfer rate due to processing delay is suppressed, so that the throughput can be improved.

Eleventh Embodiment

The transfer rate correction part 130 shown in FIG. 10 can also correct the transfer rate using the following equation (14).

$$R(n)=PRC[MCSsel(n)] \times I[MCSsel(n+d), MCSsel(n)] \quad (14)$$

Here, the same function as the function C in the abovementioned fifth embodiment can be used as the function I. The weighting measure can be determined by the mobile station information $MCS_{sel}(n)$.

In this embodiment as well, the transfer rates of the wireless packets of mobile stations in which the reception quality is improved are corrected toward the high side as time passes, while the transfer rates of the wireless packets of mobile stations in which the reception quality deteriorates are corrected toward the low side as time passes; accordingly, error in the transfer rate due to processing delay is suppressed, so that the throughput can be improved.

Twelfth Embodiment

The transfer rate correction part 130 shown in FIG. 10 can also correct the transfer rate using the following equation (15).

$$R(n)=PRC[MCSsel(n) \times J[MCSsel(n+d), MCSsel(n)]] \quad (15)$$

Specifically, in equation (14) of the abovementioned eleventh embodiment, the value of the function PRC is multiplied by the value of the function I; however, in equation (15) of the present embodiment, the value of the variable of the function PRC is multiplied by the value of the function J, and the value following this multiplication is converted into a transfer rate.

A function that is the same as the function C in the abovementioned fifth embodiment can be used as the function J. The weighting measure can be set according to the mobile station information $MCS_{sel}(n)$ In the present embodiment as well, the transfer rates of the wireless packets of mobile stations in which the reception quality is improved are corrected toward the high side as time passes, while the transfer rates of the wireless packets of mobile stations in which the reception quality deteriorates are corrected toward the low side as time passes; accordingly, error in the transfer rate due to processing delay is suppressed, so that the throughput can be improved.

Thirteenth Embodiment

Figure 12:
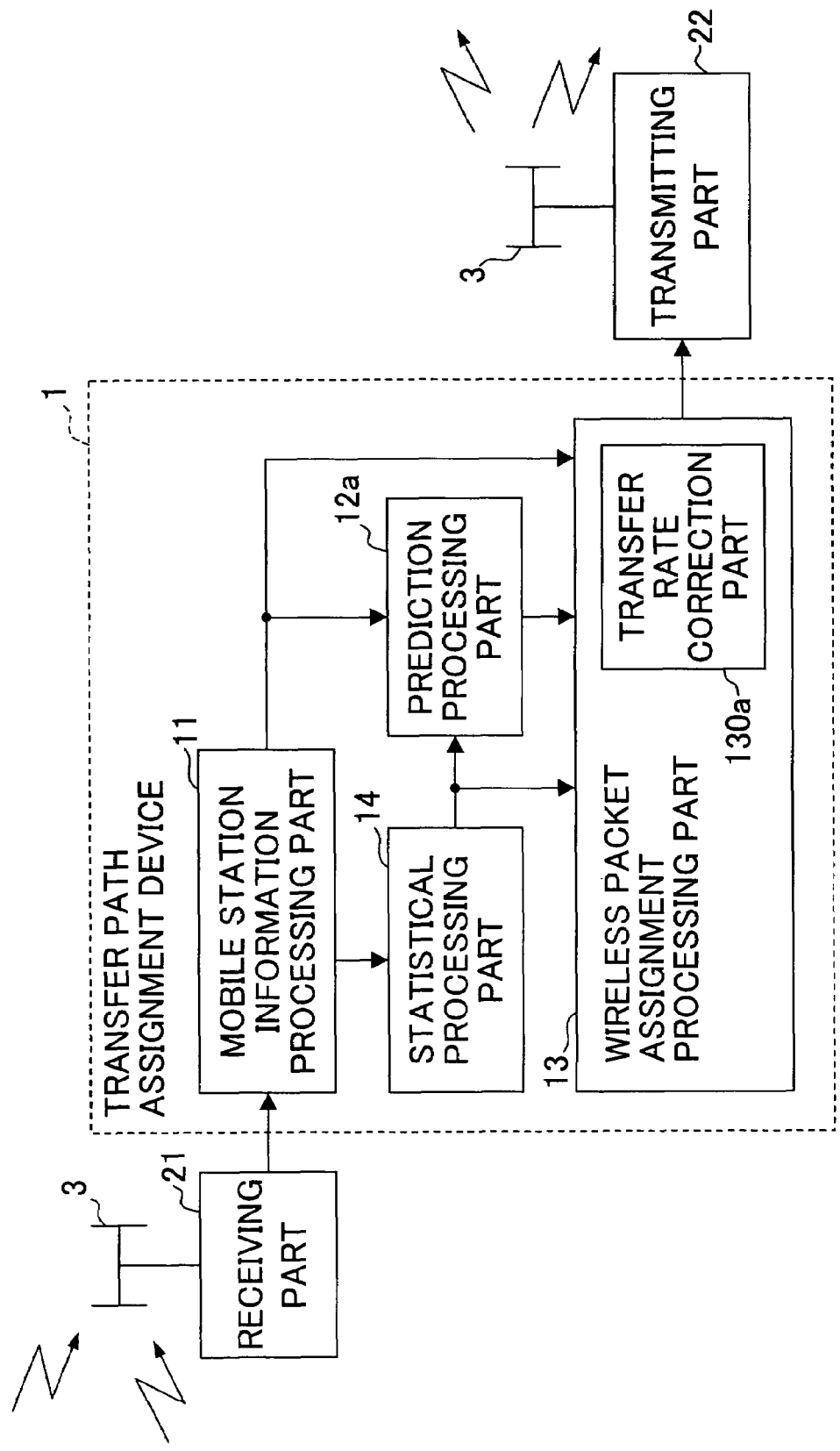
FIG. 12 is a block diagram showing the construction of the transfer path assignment device disposed in the base station according to a thirteenth embodiment of the present invention.

FIG. 12 is a block diagram which shows the construction of the transfer path assignment device 1 disposed in the base station 100 according to a thirteenth embodiment of the present invention. This transfer path assignment device 1 has a mobile station information processing part 11 connected to the receiving part 21, a prediction processing part 12a, a statistical processing part 14, and a wireless packet assignment processing part 13 connected to the transmitting part 22. Furthermore, the wireless packet assignment processing part 13 further has a transfer rate correction part 130a. Constituent elements that are the same as in the abovementioned embodiments (mobile station information processing part 11, prediction processing part 12a, statistical processing part 14, wireless packet assignment processing part 13, receiving part 21, transmitting part 22) are labeled with the same symbols, and a detailed description of such parts is omitted.

The statistical processing part 14 performs statistical processing on the basis of the mobile station information $MCS_i(n)$, and sends the statistical processing results (e.g., the long-interval average $aveMCS_i(n)$) to the wireless packet assignment processing part 13 (transfer rate correction part 130a). The prediction processing part 12a sends the future predicted value $MCS_i(n+d)$ to the wireless packet assignment processing part 13 (transfer rate correction part 130a).

The transfer rate correction part 130a determines the transfer rate R(n) by means of the following equations (16) and (17) on the basis of the current mobile station information $MCS_i(n)$, the statistical processing results (here, the long-interval average $aveMCS_i(n)$) and the future predicted value $MCS_i(n+d)$.

$$R(n) = PRC[MCSsel(n)] \times K[MCSsel(n+d), fsel(n)] \quad (16)$$

$$fsel(n) = \frac{MCSsel(n)}{aveMCSsel(n)} \quad (17)$$

Here, the same function as that used in the abovementioned seventh embodiment can be used as the function K. As a result, the weighting measure can be set by the mobile station information $f_{sel}(n)$.

In the present embodiment as well, the transfer rates of the wireless packets of mobile stations in which the reception quality is improved are corrected toward the high side as time passes, while the transfer rates of the wireless packets of mobile stations in which the reception quality deteriorates are corrected toward the low side as time passes; accordingly, error in the transfer rate due to processing delay is suppressed, so that the throughput can be improved.

Fourteenth Embodiment

The transfer rate correction part 130a in the abovementioned thirteenth embodiment can also determine the transfer rate R(n) using the following equation (18).

$$R(n)=PRC[MCSsel(n) \times L[MCSsel(n+d), fsel(n)]] \quad (18)$$

Specifically, in equation (16) of the abovementioned thirteenth embodiment, the value of the function PRC is multiplied by the value of the function K; however, in equation (18) of the present embodiment, the value of the variable of the function PRC is multiplied by the value of the function L, and the value following this multiplication is converted into a transfer rate. A function that is the same as the abovementioned function K can be used as the function L. As a result, the weighting measure can be set according to the mobile station information $f_{sel}(n)$.

In this embodiment as well, the transfer rates of the wireless packets of mobile stations in which the reception quality is improved are corrected toward the high side as time passes, while the transfer rates of the wireless packets of mobile stations in which the reception quality deteriorates are corrected toward the low side as time passes; accordingly, error in the transfer rate due to processing delay is suppressed, so that the throughput can be improved.

The embodiments described above propose the use of the present invention in a base station. However, the present invention is not limited to such a base station; the present invention can be used in an arbitrary transmitting device that selects certain receiving devices when data is to be transmitted to a plurality of receiving devices, and transmits data to the selected receiving devices.

INDUSTRIAL APPLICABILITY

The present invention can be used in a transmitting device (base station device) that transmits data by means of wireless signals to at least one of a plurality of receiving devices (mobile station devices) via a channel shared by this plurality of receiving devices (mobile station devices).

In the present invention, the processing delay from the time of reception quality measurement for the respective receiving devices (respective mobile station devices) to the time of data transmission in the transmitting device is taken into account in the assignment of data to channels, and receiving devices (mobile station devices) are selected on the basis of future predicted values relating to reception quality at the time of data transmission. Accordingly, receiving devices (mobile station devices) that are in a good reception state can be selected much more accurately, so that the generation of errors in the received data on the side of the receiving devices (mobile station devices) and the data re-transmission rate due to data errors can be reduced, thus making it possible to improve the throughput.

The invention claimed is:

1. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part; and an assignment processing part which selects receiving devices and assigns transmission data to be transmitted to said selected receiving devices to said channel on the basis of the future predicted values for the respective receiving devices at the time of data transmission determined by said prediction processing part, wherein said prediction processing part determines the reception quality data for the respective receiving devices at the time of said data transmission on the basis of said one or plurality of sets of past reception quality data for the respective receiving devices and said current reception quality data for the respective receiving devices, and determines, as said future predicted values for the respective receiving devices, multiplication results obtained by respectively multiplying the substitution results obtained by respectively substituting the reception quality data for the respective receiving devices at the time of said data transmission into a specified increasing function, and said current reception quality data for the respective receiving devices.

2. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a statistical processing part which determines the statistical processing results for the respective receiving devices by performing statistical processing of said plurality of sets of past reception quality data for the respective receiving devices or statistical processing of said current reception quality data for said respective receiving devices and said one or plurality of sets of past reception quality data for the respective receiving devices, wherein said prediction processing part determines reception quality data for the respective receiving devices at the time of said data transmission on the basis of said one or plurality of sets of past reception quality data for the respective receiving devices and said current reception quality data for the respective receiving devices, determines function values by substituting said reception quality data for the respective receiving devices at the time of said data transmission into a specified increasing function, respectively divides the current reception quality data for the respective receiving devices by the statistical processing results for the respective receiving devices determined by said statistical processing part, and determines said future predicted values for the respective receiving devices by respectively multiplying the function values for said respective receiving devices by the respective division results.

3. The transmitting device according to claim 2, wherein said statistical processing part determines a long-interval means of said plurality of sets of past reception quality data for the respective receiving devices and said current reception quality data for the respective receiving devices as the statistical processing results.

4. A transmitting device for transmitting data to at least one of a plurality of receiving devices by means of wireless signals via a channel shared by the plurality of receiving devices, comprising:
   a receiving part which receives reception quality data for the respective receiving devices that is periodically transmitted from each of said plurality of receiving devices;
   a storage part which stores one or a plurality of sets of past reception quality data for said respective receiving devices;
   a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part; and
   an assignment processing part which selects receiving devices and assigns transmission data to be transmitted to said selected receiving devices to said channel on the basis of the future predicted values for the respective receiving devices at the time of data transmission determined by said prediction processing part, wherein said prediction processing part determines, as said future predicted values for the respective receiving devices, multiplication results obtained by respectively multiplying the value of a specified increasing function depending on the reception quality data at the time of data transmission determined on the basis of said one or plurality of sets of past reception quality data for the respective receiving devices and said current reception quality data for the respective receiving devices, and said current reception quality data for the respective receiving devices, by said current reception quality data for the respective receiving devices.

5. A transmitting device for transmitting data to at least one of a plurality of receiving devices by means of wireless signals via a channel shared by the plurality of receiving devices, comprising:
   a receiving part which receives reception quality data for the respective receiving devices that is periodically transmitted from each of said plurality of receiving devices;
   a storage part which stores one or a plurality of sets of past reception quality data for said respective receiving devices;
   a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;
   an assignment processing part which selects receiving devices and assigns transmission data to be transmitted to said selected receiving devices to said channel on the basis of the future predicted values for the respective receiving devices at the time of data transmission determined by said prediction processing part; and
   a statistical processing part which determines statistical processing results for the respective receiving devices by performing statistical processing of said plurality of sets of past reception quality data for the respective receiving devices or statistical processing of said current reception quality data for the respective receiving devices and said one or plurality of sets of past reception quality data for the respective receiving devices, wherein said prediction processing part multiplies the value of a specified increasing function depending on the reception quality data for the respective receiving devices at the time of data transmission determined on the basis of said one or plurality of sets of past reception quality data for the respective receiving devices and said current reception quality data for the respective receiving devices, and said current reception quality data for the respective receiving devices, by said current reception quality data for the respective receiving devices, and determines, as said future predicted values for the respective receiving devices, division results obtained by respectively dividing these multiplication results by said statistical processing results for the respective receiving devices obtained by said statistical processing part.

6. A transmitting device for transmitting data to at least one of a plurality of receiving devices by means of wireless signals via a channel shared by the plurality of receiving devices, comprising:
   a receiving part which receives reception quality data for the respective receiving devices that is periodically transmitted from each of said plurality of receiving devices;
   a storage part which stores one or a plurality of sets of past reception quality data for said respective receiving devices;
   a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;
   an assignment processing part which selects receiving devices and assigns transmission data to be transmitted to said selected receiving devices to said channel on the basis of the future predicted values for the respective receiving devices at the time of data transmission determined by said prediction processing part; and
   a statistical processing part which determines statistical processing results for the respective receiving devices by performing statistical processing of said plurality of sets of past reception quality data for the respective receiving devices or statistical processing of said current reception quality data for the respective receiving devices and said one or plurality of sets of past reception quality data for the respective receiving devices, wherein said prediction processing part determines, as said future predicted values for the respective receiving devices, multiplication results obtained by multiplying the value of a specified increasing function depending on the reception quality data for the respective receiving devices at the time of data transmission determined on the basis of said one or plurality of sets of past reception quality data for the respective receiving devices and said current reception quality data for the respective receiving devices, and the division results obtained by respectively dividing the said current reception quality data for the respective receiving devices by said statistical processing results for the respective receiving devices obtained by said statistical processing part, by said current reception quality data.

7. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a statistical processing part which determines statistical processing results for the respective receiving devices by performing statistical processing of said plurality of sets of past reception quality data for the respective receiving devices or statistical processing of said current reception quality data for the respective receiving devices and said one or plurality of sets of past reception quality data for the respective receiving devices, wherein said prediction processing part determines, as said future predicted values for the respective receiving devices, division results obtained by respectively dividing, by said statistical processing results for the respective receiving devices obtained by said statistical processing part, the multiplication results obtained by respectively multiplying the value of a specified increasing function depending on the reception quality data for the reception quality data for the respective receiving devices at the time of data transmission determined on the basis of said one or plurality of sets of past reception quality data for the respective receiving devices and said current reception quality data for the respective receiving devices, and the division results obtained by respectively dividing said current reception quality data for the respective receiving devices by said statistical processing results for the respective receiving devices obtained by said statistical processing part, by said current reception quality data for the respective receiving devices.

8. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a transfer rate correction part which converts the current reception quality data for a receiving device selected by said assignment processing part to a transmission data transfer rate for said selected receiving device, and which multiplies said transfer rate by the value of a specified increasing function depending on the future predicted value of said selected receiving device, thus correcting said transfer rate to said multiplication results.

9. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a transfer rate correction part which multiplies the value of a specified increasing function depending on the future predicted value of a receiving device selected by said assignment processing part, by the current reception quality data for said selected receiving device, and converts said multiplication results into a transmission data transfer rate for said selected receiving device.

10. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a transfer rate correction part which converts the current reception quality data for a receiving device selected by said assignment processing device into a transmission data transfer rate for said selected receiving device, and which multiplies the value of a specified increasing function depending on both the future predicted value of said selected receiving device and the current reception quality data for said selected receiving device, by said transfer rate, thus correcting said transfer rate to said multiplication results.

11. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a transfer rate correction part which multiplies the value of a specified increasing function depending on both the future predicted value of a receiving device selected by said assignment processing part and the current reception quality data for said selected receiving device, by the current reception quality data for said selected receiving device, and converts said multiplication results into the transmission data transfer rate for said selected receiving device.

12. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a transfer rate correction part which converts the current reception quality data for a receiving device selected by said assignment processing part into a transmission data transfer rate for said selected receiving device, and which multiplies the value of a specified increasing function depending on both the future predicted value of said selected receiving device, and the division results obtained by dividing the current reception quality data for said selected receiving device by the statistical processing results of said plurality of sets of past reception quality data for said selected receiving device, or the statistical processing results of said current reception quality data for said selected receiving device and said one or plurality of sets of past reception quality data for said selected receiving device, by said transfer rate, thus correcting said transfer rate to said multiplication results.

13. A transmitting device for transmitting data to at least one of a plurality of receiving devices by means of wireless signals via a channel shared by the plurality of receiving devices, comprising:

a receiving part which receives reception quality data for the respective receiving devices that is periodically transmitted from each of said plurality of receiving devices;

a storage part which stores one or a plurality of sets of past reception quality data for said respective receiving devices;

a prediction processing part which determines future predicted values relating to the reception quality of the respective receiving devices at the time of data transmission via said channel on the basis of the one or plurality of sets of past reception quality data for the respective receiving devices stored in said storage part and current image quality data for the respective receiving devices received by said receiving part;

an assignment processing part which selects receiving devices and assigns transmission data to be transmitted to said selected receiving devices to said channel on the basis of the future predicted values for the respective receiving devices at the time of data transmission determined by said prediction processing part; and a transfer rate correction part which multiplies the value of a specified increasing function depending on both the future predicted value of said selected receiving device, and the division results obtained by dividing the current reception quality data for said selected receiving device by the statistical processing results of said plurality of sets of past reception quality data for said selected receiving device, or the statistical processing results of said current reception quality data for said selected receiving device and said one or plurality of sets of past reception quality data for said selected receiving device, by the current reception quality data for said selected receiving device, and converts said multiplication results into the transmission data transfer rate for said selected receiving device.

* * * * *